United States Patent
Zur et al.

(10) Patent No.: US 6,590,396 B1
(45) Date of Patent: Jul. 8, 2003

(54) DEVICE AND METHOD FOR INDICATING IN-USE CHARGING AND ABNORMAL DISCHARGING OF A COMBUSTION ENGINE BATTERY FOLLOWING ENGINE TURN-OFF

(75) Inventors: Amos Zur, Petach Tikva (IL); Jacob Yaffe, Yehud (IL)

(73) Assignee: Battery Alert, Ltd., Yavne (IL)

( * ) Notice: Subject to any disclaimer, the term of this patent is extended or adjusted under 35 U.S.C. 154(b) by 0 days.

(21) Appl. No.: 09/831,573

(22) PCT Filed: Nov. 1, 1999

(86) PCT No.: PCT/IL99/00579

§ 371 (c)(1),
(2), (4) Date: May 11, 2001

(87) PCT Pub. No.: WO00/44079

PCT Pub. Date: Jul. 27, 2000

(30) Foreign Application Priority Data

Jan. 19, 1999 (IL) .................................................. 128132

(51) Int. Cl.[7] ........................................... G01N 27/416
(52) U.S. Cl. ...................................................... 324/433
(58) Field of Search ................................. 324/426–433; 340/455, 438, 660, 661; 320/132, 134

(56) References Cited

U.S. PATENT DOCUMENTS

| | | | |
|---|---|---|---|
| 3,997,888 A | 12/1976 | Kremer | 340/636 |
| 4,193,026 A | 3/1980 | Finger et al. | 324/428 |
| 5,339,017 A | 8/1994 | Yang | 340/636 |
| 5,818,333 A | 10/1998 | Yaffe et al. | 340/455 |
| 6,091,325 A | 7/2000 | Zur et al. | 340/455 |
| 6,208,148 B1 * | 3/2001 | Yuen | 324/433 |
| 6,437,575 B1 * | 8/2002 | Lin et al. | 324/433 |

* cited by examiner

*Primary Examiner*—Edward H. Tso
*Assistant Examiner*—Pia Tibbits
(74) *Attorney, Agent, or Firm*—G.E. Ehrlich Ltd.

(57) ABSTRACT

A device and corresponding method for indicating in-use charging and abnormal discharging of a combustion engine battery during and following engine turn-off using a current sensor, a charge level tester, a latch circuit, a charge indicator, and a voltage level tester for detecting, measuring, indicating, and storing an indication of in-use normal or abnormal battery charging/discharging.

82 Claims, 6 Drawing Sheets

DEVICE AND METHOD FOR INDICATING IN-USE CHARGING AND ABNORMAL DISCHARGING OF A COMBUSTION ENGINE BATTERY FOLLOWING ENGINE TURN-OFF

FIELD AND BACKGROUND OF THE INVENTION

The present invention relates to monitoring of electrical components and, in particular, it relates to a device and corresponding method for indicating in-use charging and abnormal discharging of a combustion engine battery following engine turn-off.

The battery of a combustion engine may be considered one of the principle components of the overall electrical system of a vehicle or a device operable by the combustion engine, since so much depends upon its proper and reliable function. In general, a combustion engine refers to any engine operating by combustion or burning of fuel in the presence of a supply of oxidation. A combustion engine may be part of a vehicle, where a vehicle may be any mobile device powered by the combustion engine for carrying or transporting persons or objects of any kind, for example, an automobile, a recreational vehicle, a truck, a farm vehicle such as a tractor or cotton combine, a fork lift, a train, an airplane, or a boat. A combustion engine may also be part of a stand alone, generally immobile, device, such as an electrical generator, a cement mixer, or heavy duty power machinery.

The importance of the battery of a combustion engine is most needed and appreciated at the time of starting the engine. Operation of a combustion engine ordinarily involves activating a starter mechanism. A starter mechanism of a combustion engine typically features a multitude of electrical and mechanical elements, including the basic elements of a battery as an initial source of electrical power, a starter motor for mechanically meshing with and turning the crankshaft of the engine motor, the engine motor crankshaft, a coil for generating high voltage required for continuous operation of the engine, and a myriad of related electrical and mechanical circuitry and connections among the various elements of the starter mechanism and related mechanisms and elements of the engine. In principle, a starter mechanism of a combustion engine operates in relation to an electrically and mechanically varying load, where the load features a varying combination of electrical and mechanical loads.

It is known that a vehicle battery, for any vehicle as described above, is ordinarily characterized by a rated state or condition of in-use charge having a limited lifetime during which the battery is expected to properly function by activating or energizing the starter mechanism for starting the motor of a combustion engine. Following this charged state lifetime, which is generally predictable according to particular operating conditions of a charge rated battery, the battery must eventually be replaced. Typically, checking a battery for possible replacement, or simply replacing the battery, is only performed once the battery, having a below normal state of charge, is no longer able to start the engine. This situation may arise when a vehicle operator is in a hurry to drive somewhere, during rain and/or cold weather, at holiday times when garages are usually closed, or when one is a long distance from help. Battery failure is therefore a common source of aggravation for many vehicle operators on a daily basis.

A number of methods are available for determining when the state or condition of charge of a battery is insufficient to activate or energize a starter motor and thus fail to enable starting of the vehicle engine. One method is to measure the specific gravity of the electrolyte within a battery. This procedure is ordinarily done by a professional or trained auto mechanic, since hazardous chemicals are involved during such a measurement. Another method involves measuring the internal resistance of a battery by using one of various procedures. This method also requires technical/professional knowledge and/or workers. Yet another method involves continuous measurement and display of battery voltage during the entire life of the battery.

An example of a system based on measuring internal resistance of a battery is disclosed in U.S. Pat. No. 5,339,017 to Yang which describes a device for checking the charge state of a vehicle battery. This device checks battery charge by indirectly measuring internal resistance of the battery. This is done by measuring voltage of a capacitor charged by a vehicle battery. Measurement is performed at a predetermined time. At higher capacitor voltage, internal resistance of the battery is lower, and the state of charge of the battery is considered inside the rated working range. The device provides visual display of capacitor voltage, thereby indicating battery internal resistance, which in turn shows the state of charge of the battery. Measuring internal resistance of a battery typically results in high consumption of energy and heating of the battery, potentially causing sparks leading to an engine fire or other damage if done by an improperly trained person.

To overcome limitations associated with the above described methods, Yaffe et al., in U.S. Pat. No. 5,818,333, which is incorporated by reference for all purposes as if filly set forth herein, disclose a device and method for measuring the state of charge of a combustion engine battery and warning when the battery is about to run out, but is still able to start a vehicle motor,. thereby allowing a vehicle operator to continue driving the vehicle, and prepare for timely replacement of the battery. The disclosed device 10, shown as a block diagram in FIG. 1, includes (a) a voltage level tester 11 for measuring, either directly or indirectly, a voltage across battery terminals 8 and 9 at the end of a given engine starting time interval, (b) a timer 12 responsive to activation of a starter mechanism to time the given engine starting time interval, (c) a counter 15 for maintaining a cumulative or incremental count of occasions on which the battery voltage is below a given level, and (d) an alarm unit 16 for providing a warning signal when the cumulative or incremental count exceeds a pre-determined number of counts. In a preferred embodiment, the voltage level tester continuously measures the voltage across the battery, and the timer identifies activation of the starter mechanism by a corresponding sudden drop in voltage across the battery.

According to the method for operating device 10 disclosed by Yaffe et al., the warning signal, in the form of an audible alarm or visual signal, activates when the incremental count exceeds a given number, following activation of the starter mechanism or motor. The main objective of this procedure, that of alerting a vehicle operator, following engine starting, of deterioration of a starter mechanism in general, and of near failing battery charge in particular, may not be achieved for one or a combination of the following realistically limiting reasons.

First, following engine starting, activation of a standard audible alarm used in such an application may be insufficiently loud to overcome normal background noise internal and/or external to the vehicle, continuing henceforth from engine starting, in order to be effectively heard by the vehicle operator. With respect to noise internal to the vehicle, this is especially the case if vehicle accessories such as a radio and/or a climate control mechanism are simultaneously activated with engine starting, a situation quite commonly occurring as a consequence of a vehicle operator failing to turn-off all accessories prior to the time of previous engine turn-off. Moreover, depending upon the immediate environment of the initially parked vehicle, such an audible alarm simply may not be able to compete with substantially higher decibel levels of noise external to the vehicle, especially in urban environments.

Second, following engine starting, activation of a deteriorating starter mechanism visual warning signal appearing, for example, somewhere along the operator side of the vehicle dashboard, may not be noticed among the standard multitude of visual signals also displayed along the operator side of the vehicle dashboard during the time of starting the engine. Third, following engine starting, the audible alarm and/or visual signal may malfunction or even be entirely absent due to circuit failure. Thus, the device and method for warning a vehicle operator of starter mechanism, or battery charge, deterioration as disclosed by Yaffe et al., are expected to be effective under essentially ideal engine starting conditions, but, are notably limited under realistic vehicle starting and operating conditions.

These three limitations associated with the device and method of Yaffe et al. are successfully overcome in an improved device and method for measuring and warning of vehicle battery deterioration, as disclosed by the same inventors, Zur et al., in U.S. patent application Ser. No. 09/404,832, which is incorporated by reference for all purposes as if fully set forth herein. The disclosed device 40, shown as a block diagram in FIG. 2, includes the same components as device 10 of FIG. 1, and as the improvement, additionally includes (e) at least one engine noise and/or vibration sensor 20 operatively connected for sensing engine noise and/or vibration, (f) at least one engine noise and/or vibration level tester 22 operatively connected so as to measure engine noise and/or vibration and to compare the measurement to a corresponding pre-determined threshold level of engine noise and/or vibration for distinguishing between engine activation and engine non-activation, where engine non-activation includes engine turn-off, (g) a logic circuit 24 operatively connected to engine noise and/or vibration level tester 22 and to alarm unit 16 for performing at least one 'AND' logic operation on a first signal received from engine noise and/or vibration level tester 22 and on a delayed second signal received from counter 15, such that logic circuit 24 upon completing the correct 'AND' logic operation actuates alarm unit 16 for providing an additional warning signal following engine turn-off, and (h) a delay mechanism 26 operatively connected to counter 15 and to logic circuit 24 for effecting the delay of the delayed second signal sent from counter 15 to logic circuit 24 so as to effect actuation of alarm unit 16 for providing the additional warning signal following engine turn-off.

According to the method of operation of device 40 disclosed by Zur et al., the warning signal activates a first time when the incremental count of below level battery charge exceeds a given number following activation of the starter mechanism or motor, and activates a second time when noise and/or vibration level tester 22 registers engine noise and/or vibration less than a threshold level corresponding to engine turn-off, so as to provide the vehicle operator an additional warning of battery charge deterioration, regardless of whether the first warning signal was actuated, noticed or heard.

There are several sources of below normal charge state or deterioration of a combustion engine battery. First, focusing on the battery itself, as a consequence of the chemical composition and mechanism of consumption of a standard combustion engine battery, normal use and aging involve a slow, but gradual, decrease in the charge state of the battery. Thus, assuming all mechanisms and components of the electrical system, such as lights or air conditioning, of the combustion engine which are in electronic communication with the battery are normally operated by an operator and properly functioning, battery charge declines with time during normal usage. Second, focusing on the overall electrical system of a combustion engine, since the battery is in electronic communication with multiple mechanisms and components of the electrical system, a malfunction in one or more of such mechanisms or components could cause abnormal and excessive drainage of battery charge and therefore cause battery charge deterioration. For example, a malfunctioning starter mechanism may involve an excessive load being placed upon the battery during starting conditions, thereby accelerating battery charge deterioration. Alternatively, a malfunctioning charging mechanism, featuring standard electrical system components such as an alternator or generator and related circuitry and wiring to the battery, may be abnormally charging the battery during operation of the vehicle or device. Alternatively, a fault in the circuit, wiring, or activation, of an anti-theft alarm device, may involve a relatively small, but continuous, parasitic load being placed upon the battery during engine non-operating conditions, thereby gradually accelerating battery charge deterioration.

A third common source of battery charge deterioration focuses on the operator of a combustion engine of a vehicle or a device at the time of turning off the engine, where the operator fails to turn-off lights used for either driving the vehicle or operating the device with lights, or where the operator activates hazard lights for an excessive duration. Leaving lights on, especially the main high-intensity headlights, following engine turn-off, for an extended period of time such as more than a couple of hours, produces the highly undesirable effect of significant, or deep, battery discharge leading to accelerated battery deterioration and ultimately termination of battery function.

Detecting, measuring, and indicating or warning of in-use battery charge deterioration, during engine starting and following engine turn-off, are successfully accomplished by applying improved device 40 and the method disclosed by Zur et al., however, there is no provision for indicating in-use normal battery charging, or abnormal battery charging due specifically to a malfunctioning charging system, or, abnormal battery discharging due specifically to an operator leaving lights on or faulty operation of an anti-theft alarm system, either during engine operation or following engine turn-off. In particular, device 40 shown in FIG. 2 and corresponding method, can be used for generally indicating battery charge deterioration relating to a problem with the starter mechanism, where the starter mechanism includes the battery and other components, either during the time of starting or following turning off the combustion engine. It may only later be determined, for example, by separate mechanical inspection, that the source of in-use battery charge deterioration is a problem related to another malfunctioning mechanism or component, such as the alternator, of the overall combustion engine electrical system, and may not be a problem of the battery itself.

Ideally, a combustion engine battery charge monitoring device includes a means for in-use detecting, measuring, and indicating battery charging and/or discharging, immediately following the start of a charging problem, and includes a means for indicating, and remembering or storing the indication, during and following engine turn-off for the engine in the off mode. The utility of providing a means for remembering or storing the indication of in-use abnormal battery charging and/or discharging during and following engine turn-off is to enable a vehicle operator or mechanic to locate and properly diagnose the charging and/or discharging problem, either immediately following engine turn-off, or, at a later, more convenient time following engine turn-off. There exist devices and methods for detecting, measuring, and indicating a problem related to in-use battery charging and/or discharging during operation of a vehicle or device, but none provides a means or mechanism for indicating, or remembering or storing an indication of, in-use battery charging or discharging during or following engine turn-off.

In U.S. Pat. No. 3,997,888 issued to Kremer, a device is described for monitoring the state of charge of a battery during engine operation, including a voltage divider, a resistive bridge circuit, a current sensor, an amplifier, and a detector. During battery discharge, a reduction of battery voltage unbalances the resistive bridge circuit causing an opposite sense voltage compensation proportional to the discharge current measured by the current sensor. The device also includes a pulse generator, counter, and integrator for selectively actuating the detector, according to a pre-determined threshold level of drop in battery voltage, for establishing an alarm condition corresponding to battery discharge.

In U.S. Pat. No. 4,193,026 issued to Finger et al., a device and method are disclosed for measuring the state of charge of a battery during its discharge from a charged condition, during engine operation, including a means for monitoring voltage output, a pulse generator, counter, and integrator, and a means for producing a warning signal according to a pre-determined threshold level of rate of drop in battery voltage during the discharge time interval. The device of Finger et al., in contrast to that of Kremer, includes no current sensor for determining battery discharge.

With respect to indicating a problem specifically related to the charging mechanism in general, or alternator in particular, of a combustion engine, vehicles are ordinarily equipped with a standard device for indicating such a problem including an automatically activatable low charging indicator lamp or LED located along the dashboard. During in-use vehicle operation, the low charging indicator lamp goes on and off, according to the state of the charging mechanism, and according to predetermined criteria or threshold levels of charging set into the device by the vehicle manufacturer. In a typical scenario, the low charging indicator lamp goes on simultaneous with engine starting, as the charging mechanism has not yet achieved steady state of full or normal battery charging. Essentially immediately thereafter, the low charging indicator lamp goes off, indicating normal operation of the charging mechanism in general, and the alternator in particular. During steady state operation of the vehicle, should the state or magnitude of battery charging fall below one of the pre-set criteria or threshold levels, the low charging indicator lamp once again goes on. During continued vehicle operation, should the state or magnitude of battery charging rise above the pre-set criterion or threshold level, the low charging indicator lamp once again goes off, and so on, automatically, according to the charging dynamics of the charging mechanism throughout the duration of vehicle operation. Once the engine is turned off, however, the in-use low charging indicator lamp goes off until renewed starting of the engine.

Each of the above described prior art devices and methods enables monitoring and warning of in-use abnormal battery charging and/or discharging during engine operation, but includes no means or mechanism for remembering or storing the indication of in-use abnormal, or normal, battery charging or discharging during or following engine turn-off.

With respect to indicating a problem of abnormal or parasitic battery discharging caused by a vehicle operator accidentally or intentionally leaving headlights on following engine turn-off, resulting in undesirably draining battery charge, vehicles ate ordinarily equipped with a standard device for indicating such a problem by an automatically actuatable audio or visual indicator. One such standard device operates according to a mechanism featuring a logical 'AND' gate, wherein an electrical circuit includes one connection to the vehicle headlights switch and a second connection to a vehicle door, typically the door of the vehicle operator, such that the logical 'AND' condition is fulfilled when the headlights switch is in the on position and the operator opens the door for leaving the vehicle.

Clearly, this type of widely used device is useful for reminding the vehicle operator to turn off the headlights. However, it is exclusively limited to providing indirect indication of abnormal battery discharging only with respect to leaving headlights on, and provides no indication, direct or indirect, of any other problem of abnormal or parasitic battery discharging, such as that caused by an improperly functioning vehicle anti-theft alarm system or by hazard warning lights left on for an excessive duration, during or following engine turn-off.

To one of ordinary skill of the art, there is thus a need for, and it would be highly advantageous to have a device and corresponding method for indicating in-use charging and abnormal discharging of a combustion engine battery following engine turn-off.

SUMMARY OF THE INVENTION

The present invention relates to a device and corresponding method for indicating in-use charging and abnormal discharging of a combustion engine battery following engine turn-off. The device and method of the present invention are based on the novel cooperative operation of a current sensor, a charge level tester, a latch circuit, a charge indicator, and a voltage level tester, in a first circuit for detecting, measuring, indicating, and storing an indication of in use normal or abnormal battery charging during engine operation throught engine turn-off, and cooperative operation of the current sensor, a discharge level tester, a delay mechanism, a high discharge indicator, and the voltage level tester, in a second circuit for detecting, measuring, and indicating abnormal battery discharging following engine turn-off.

It is therefore an object of the present invention to provide a device for indicating in-use charging and abnormal discharging of a combustion engine battery following engine turn-off.

It is another object of the present invention to provide a method for indicating in-use charging and abnormal discharging of a combustion engine battery following engine turn-off.

It is a further object of the present invention to provide a device and method for indicating in-use charging of a combustion engine battery following engine turn-off, featuring the capability of monitoring battery charging during engine operation, providing an indication of normal or abnormal battery charging during engine operation, and for storing the indication of normal or abnormal battery charging from the initial indication of battery charging through engine turn-off until engine restart.

It is a further object of the present invention to provide a device and method for indicating abnormal discharging of a combustion engine battery following engine turn-off, featuring the capability of monitoring battery discharge following engine turn-off, for example, by providing an operator warning of either lights left on, or of an improperly operating vehicle anti-theft alarm system, following engine turn-off.

Thus, according to the present invention, there is provided a device for indicating in-use charging and abnormal discharging of a combustion engine battery following engine turn-off, comprising: (a) a first circuit for the indicating in-use battery charging during engine operation, through and following engine turn-off, the first circuit comprising: (i) a first circuit current sensor operatively connected for sensing in-use battery charging current, converting the sensed in-use battery charging current into a voltage proportional to the sensed in-use battery charging current, and generating an in-use battery charging signal corresponding to the voltage; (ii) a charge level tester operatively connected to the first circuit current sensor for measuring a magnitude of the in-use battery charging signal sent by the first circuit current sensor, comparing the in-use battery charging signal magnitude to a pre-determined in-use battery charging level, and generating a charge level tester signal proportional to the in-use battery charging signal magnitude when the in-use battery charging signal magnitude is greater than the pre-determined in-use battery charging level; (iii) a latch circuit operatively connected to the charge level tester for receiving and registering the charge level tester signal sent by the charge level tester as an indication of the in-use battery charging, storing the indication of the in-use battery charging, and generating a latch circuit signal corresponding to the stored indication of the in-use battery charging; (iv) a charge indicator operatively connected to the latch circuit for receiving the latch circuit signal corresponding to the stored indication of the in-use battery charging, and providing an indication of the in-use battery charging to an engine operator during the in-use engine operation, through and following the engine turn-off; and (v) a first circuit voltage level tester operatively connected to the engine battery for measuring voltage of the engine battery, comparing the battery voltage to a pre-determined battery voltage level corresponding to engine starting, and sending a first circuit voltage level tester signal to the latch circuit for resetting the latch circuit when the battery voltage is less than the pre-determined battery voltage level corresponding to engine starting; and (b) a second circuit for the indicating abnormal battery discharging following engine turn-off, the second circuit comprising: (i) a second circuit current sensor operatively connected for sensing battery discharging current, converting the sensed battery discharging current into a voltage proportional to the sensed battery discharging current, and generating a battery discharging signal corresponding to the voltage; (ii) a discharge level tester operatively connected to the second circuit current sensor for measuring a magnitude of the battery discharging signal sent by the second circuit current sensor, comparing the battery discharging signal magnitude to at least one pre-determined battery discharging level corresponding to the battery abnormal discharging, and generating a discharge level tester signal proportional to the battery discharging signal magnitude when the battery discharging signal magnitude is greater than the at least one pre-determined battery discharging level; (iii) a delay mechanism for delaying sending of the discharge level tester signal by the discharge level tester until the delay mechanism receives an indication of the engine turn-off and sends a delay mechanism signal corresponding to the indication of the engine turn-off to the discharge level tester; (iv) a high discharge indicator operatively connected to the discharge level tester for receiving the delayed discharge level tester signal corresponding to the battery abnormal discharging, and providing an indication of the battery abnormal discharging to an engine operator following the engine turn-off; and (v) a second circuit voltage level tester operatively connected to the engine battery for measuring the battery voltage, comparing the battery voltage to a pre-determined battery voltage level corresponding to the engine turn-off, and sending a second circuit voltage level tester signal to the delay mechanism when the battery voltage is less than the pre-determined battery voltage level corresponding to the engine turn-off.

According to further features in this preferred embodiment of the device described below, the first circuit current sensor features a current sensor mechanism selected from the group consisting of a Hall Effect current sensor mechanism configured externally and immediately parallel to a wire electrically connecting a battery lead to a load of the engine, and a current sensor mechanism electrically connected in series of a wire electrically connecting a battery lead to the load of the engine.

According to still further features in this preferred embodiment of the device described below, the first circuit in-use battery charging current sensed by the first circuit current sensor corresponds to the battery charging current selected from the group consisting of normal battery charging current and abnormal battery charging current.

According to still further features in this preferred embodiment of the device described below, the first circuit pre-determined battery charging level includes a charging level greater than initial battery charging effected by a charging mechanism, the charging mechanism is selected from the group consisting of an alternator and a generator.

According to still further features in this preferred embodiment of the device described below, the first circuit indication of the in-use battery charging provided by the charge indicator appears at a location selected from the group consisting of internal to a part of the engine and external to a part of the engine, external to a part of the engine includes internal to a vehicle cabin along a dashboard display, and whereby the indication is of a form selected from the group consisting of-a warning signal and a non-warning signal, the warning signal is selected from the group consisting of an audio signal, a visual signal, and an electromagnetic signal, the non-warning signal includes a digital readout.

According to still further features in this preferred embodiment of the device described below, the first circuit first circuit voltage level tester is connected to the engine battery by a connection selected from the group consisting of a direct electro mechanical connection to leads of the battery and an indirect electrical connection to the engine battery, the indirect electrical connection features the first circuit voltage level tester connected in an electrical circuit of the engine selected from the group consisting of internal to a part of the engine and external to the engine.

According to still further features in this preferred embodiment of the device described below, the second circuit at least one pre-determined battery discharging level corresponding to the battery abnormal discharging is selected from the group consisting of a battery discharging level corresponding to vehicle headlights in an operative mode, a battery discharging level corresponding to vehicle hazard lights in an operative mode, a battery discharging level corresponding to a vehicle anti-theft alarm device in an abnormal operative mode, and a battery discharging level corresponding to at least one vehicle accessory in an abnormal operative mode.

According to still further features in this preferred embodiment of the device described below, the second circuit indication of the battery abnormal discharging provided by the high discharge indicator appears at a location selected from the group consisting of internal to a part of the engine and external to a part of the engine, external to a part of the engine includes internal to a vehicle cabin along a dashboard display, and whereby the indication is of a form selected from the group consisting of a warning signal and a non-warning signal, the warning signal selected from the group consisting of an audio signal, a visual signal, and an electromagnetic signal.

According to still further features in this preferred embodiment of the device described below, the second circuit second circuit voltage level tester is connected to the engine battery by a connection selected from the group consisting of a direct electro mechanical connection to leads of the battery and an indirect electrical connection to the engine battery, the indirect electrical connection features the second circuit voltage level tester connected in an electrical circuit of the engine selected from the group consisting of internal to a part of the engine and external to the engine.

According to still further features in this preferred embodiment of the device described below, the device further comprises at least one temperature sensor associated with corresponding at least one component of the device selected from the group consisting of the charge level tester, the discharge level tester, the first circuit voltage level tester, and the second circuit voltage level tester, for measuring ambient temperature in a vicinity of the engine, and wherein the at least one component varies and is adjustable in relation to the ambient temperature.

According to still further features in this preferred embodiment of the device described below, the first circuit current sensor and the second circuit current sensor are configured, operatively connected, and function as a single current sensor for sensing battery current selected from the group consisting of the in-use battery charging current and the battery discharging current, converting the sensed battery current into a voltage proportional to the sensed battery current, and generating a current sensor signal selected from the group consisting of the in-use battery charging signal and the battery discharging signal, corresponding to the voltage.

According to still further features in this preferred embodiment of the device described below, the first circuit voltage level tester and the second circuit voltage level tester are configured, operatively connected to the engine battery, and function as a single voltage level tester for measuring the battery voltage, comparing the battery voltage to the pre-determined battery voltage levels, sending a corresponding voltage level tester signal to the latch circuit for resetting the latch circuit when the battery voltage is less than the pre-determined battery voltage level corresponding to engine starting, and sending a corresponding voltage level tester signal to the delay mechanism when the battery voltage is less than the pre-determined battery voltage level corresponding to the engine turn-off.

According to still further features in this preferred embodiment of the device described below, the device further comprises: (c) a third circuit operatively connected to the voltage level tester selected from the group consisting of the first circuit voltage level tester and the second circuit voltage level tester, for detecting and warning of a problem with a starter mechanism of the combustion engine.

According to still further features in this preferred embodiment of the device described below, the third circuit comprises: (i) the voltage level tester for continuously measuring the battery voltage at the end of a given engine starting time interval; (ii) a timer responsive to activation of the starter mechanism to time the given engine starting time interval; (iii) a counter for maintaining a cumulative count of occasions on which the battery voltage is below a given level; and (iv) an alarm unit for providing a warning signal, the warning signal actuated in at least one form selected from the group consisting of an audible signal, a visual signal, and an electromagnetic signal, when the cumulative count exceeds a pre-determined number of counts, following activation of the starter mechanism, the warning signal temporally actuated selected from the group consisting of during activation of the starter mechanism, following engine turn-off, and, during activation of the starter mechanism and following engine turn-off According to another aspect of the present invention, there is provided a device for indicating in-use charging and abnormal discharging of a combustion engine battery following engine turn-off, comprising: (a) a first circuit for the indicating in-use battery charging during engine operation, through and following engine turn-off, the first circuit comprising: (i) a first circuit current sensor operatively connected for sensing in-use battery charging current, converting the sensed in-use battery charging current into a voltage proportional to the sensed in-use battery charging current, and generating an in-use battery charging signal corresponding to the voltage; (ii) a charge level tester operatively connected to the first circuit current sensor for measuring a magnitude of the in-use battery charging signal sent by the first circuit current sensor, comparing the in-use battery charging signal magnitude to a pre-determined in-use battery charging level, and generating a charge level tester signal proportional to the in-use battery charging signal magnitude when the in-use battery charging signal magnitude is greater than the pre-determined in-use battery charging level; (iii) a latch circuit operatively connected to the charge level tester for receiving and registering the charge level tester signal sent by the charge level tester as an indication of the in-use battery charging, storing the indication of the in-use battery charging, and generating a latch circuit signal corresponding to the stored indication of the in-use battery charging; (iv) a charge indicator operatively connected to the latch circuit for receiving the latch circuit signal corresponding to the stored indication of the in-use battery charging, and providing an indication of the in-use battery charging to an engine operator during the engine operation, through and following the engine turn-off; and (v) a voltage level tester operatively connected to the engine battery for measuring voltage of the engine battery, comparing the battery voltage to a pre-determined battery voltage level corresponding to engine starting, and sending a voltage level tester signal to the latch circuit for resetting the latch circuit when the battery voltage is less than the pre-determined battery voltage level corresponding to engine starting; and (b) a second circuit for the indicating abnormal battery discharging following engine turn-off, the second circuit comprising: (i) a second circuit current sensor operatively connected for sensing battery discharging current, converting the sensed battery discharging current into a voltage proportional to the sensed battery discharging current, and generating a battery discharging signal corresponding to the voltage; (ii) a discharge level tester operatively connected to the second circuit current sensor for measuring a magnitude of the battery discharging signal sent by the second circuit current sensor, comparing the battery discharging signal magnitude to at least one predetermined battery discharging level corresponding to the battery abnormal discharging, and generating a discharge level tester signal proportional to the battery discharging signal magnitude when the battery discharging signal magnitude is greater than the at least one pre-determined battery discharging level; (iii) a delay mechanism for delaying sending of the discharge level tester signal by the discharge level tester until the delay mechanism receives an indication of the engine turn-off and sends a delay mechanism signal corresponding to the indication of engine turn-off to the discharge level tester; (iv) a high discharge indicator operatively connected to the discharge level tester for receiving the delayed discharge level tester signal corresponding to the battery abnormal discharging, and providing an indication of the battery abnormal discharging to an engine operator; (v) at least one engine characteristic sensor selected from the group consisting of engine noise sensors and engine vibration sensors operatively connected for sensing at least one engine characteristic selected from the group consisting of engine noise and engine vibration, and generating at least one engine characteristic sensor signal corresponding to the at least one engine characteristic; and (vi) at least one engine characteristic level tester selected from the group consisting of engine noise level testers and engine vibration level testers operatively connected to the at least one engine characteristic sensor for measuring the at least one engine characteristic sensor signal generated and sent by the at least one engine characteristic sensor, comparing the measurement to at least one corresponding predetermined threshold level of the at least one engine characteristic for distinguishing between engine operation and engine non-operation, the engine non-operation including the engine turn-off, and sending at least one engine characteristic level tester signal to the delay mechanism when the measurement is less than the at least one corresponding pre-determined threshold level of the at least one engine characteristic corresponding to the engine turn-off.

According to further features in this preferred embodiment of the device described below, the second circuit the at least one engine characteristic level tester measures the at least one engine characteristic sensor signal as a function of time selected from the group consisting of a continuous function of time and a discontinuous function of time.

According to still further features in this preferred embodiment of the device described below, the device further comprises at least one temperature sensor associated with corresponding at least one component of the device selected from the group consisting of the charge level tester, the discharge level tester, the first circuit voltage level tester, the second circuit voltage level tester, and the at least one engine characteristic level tester, for measuring ambient temperature in a vicinity of the engine, and wherein the at least one component varies and is adjustable in relation to the ambient temperature.

According to still further features in this preferred embodiment of the device described below, the device further comprises: (c) a third circuit operatively connected to the voltage level tester for detecting and warning of a problem with a starter mechanism of the combustion engine.

According to another aspect of the present invention, there is provided a device for indicating abnormal discharging of a combustion engine battery following engine turn-off, comprising: (a) a current sensor operatively connected for sensing battery discharging current, converting the sensed battery discharging current into a voltage proportional to the sensed battery discharging current, and generating a battery discharging signal corresponding to the voltage; (b) a discharge level tester operatively connected to the current sensor for measuring a magnitude of the battery discharging signal sent by the current sensor, comparing the battery discharging signal magnitude to at least one pre-determined battery discharging level corresponding to the battery abnormal discharging, and generating a discharge level tester signal proportional to the battery discharging signal magnitude when the battery discharging signal magnitude is greater than the at least one pre-determined battery discharging level; (c) a delay mechanism for delaying sending of the discharge level tester signal by the discharge level tester until the delay mechanism receives an indication of the engine turn-off and sends a delay mechanism signal corresponding to the indication of the engine turn-off to the discharge level tester; (d) a high discharge indicator operatively connected to the discharge level tester for receiving the delayed discharge level tester signal corresponding to the battery abnormal discharging, and providing an indication of the battery abnormal discharging to an engine operator following the engine turn-off; and (e) a voltage level tester operatively connected to the engine battery for measuring the battery voltage, comparing the battery voltage to a predetermined battery voltage level corresponding to the engine turn-off, and sending a voltage level tester signal to the delay mechanism when the battery voltage is less than the pre-determined battery voltage level corresponding to the engine turn-off.

According to another aspect of the present invention, there is provided a device for indicating abnormal discharging of a combustion engine battery following engine turn-off, comprising: (a) a current sensor operatively connected for sensing battery discharging current, converting the sensed battery discharging current into a voltage proportional to the sensed battery discharging current, and generating a battery discharging signal corresponding to the voltage; (b) a discharge level tester operatively connected to the current sensor for measuring a magnitude of the battery discharging signal sent by the current sensor, comparing the battery discharging signal magnitude to at least one pre-determined battery discharging level corresponding to the battery abnormal discharging, and generating a discharge level tester signal proportional to the battery discharging signal magnitude when the battery discharging signal magnitude is greater than the at least one pre-determined battery discharging level; (c) a delay mechanism for delaying sending of the discharge level tester signal by the discharge level tester until the delay mechanism receives an indication of the engine turn-off and sends a delay mechanism signal corresponding to the indication of the engine turn-off to the discharge level tester; (d) a high discharge indicator operatively connected to the discharge level tester for receiving the delayed discharge level tester signal corresponding to the battery abnormal discharging, and providing an indication of the battery abnormal discharging to an engine operator following the engine turn-off; (e) at least one engine characteristic sensor selected from the group consisting of engine noise sensors and engine vibration sensors operatively connected for sensing at least one engine characteristic selected from the group consisting of engine noise and engine vibration, and generating at least one engine characteristic sensor signal corresponding to the at least one engine characteristic; and (f) at least one engine characteristic level tester selected from the group consisting of engine noise level testers and engine vibration level testers operatively connected to the at least one- engine characteristic sensor for measuring the at least one engine characteristic sensor signal generated and sent by the at least one engine characteristic sensor, comparing the measurement to at least one corresponding pre-determined threshold level of the at least one engine characteristic for distinguishing between engine operation and engine non-operation, the engine non-operation including the engine turn-off, and sending at least one engine characteristic level tester signal to the delay mechanism when the measurement is less than the at least one corresponding pre-determined threshold level of the at least one engine characteristic corresponding to the engine turn-off.

According to another aspect of the present invention, there is provided a method for indicating in-use charging and abnormal discharging of a combustion engine battery following engine turn-off, comprising: (a) indicating in-use battery charging during engine operation, through and following engine turn-off, by operation of a first circuit, the operation of the first circuit comprising: (i) sensing in-use battery charging current, converting the sensed in-use battery charging current into a voltage proportional to the sensed in-use battery charging current, and generating an in-use battery charging signal corresponding to the voltage, by an operatively connected first circuit current sensor; (ii) measuring a magnitude of the in-use battery charging signal sent by the first circuit current sensor, comparing the first in-use battery charging signal magnitude to a predetermined in-use battery charging level, and generating a charge level tester signal proportional to the in-use battery charging signal magnitude when the in-use battery charging signal magnitude is greater than the pre-determined in-use battery charging level, by a charge level tester operatively connected to the first circuit current sensor; (iii) receiving and registering the charge level tester signal sent by the charge level tester as an indication of the in-use battery charging, storing the indication of the in-use battery charging, and generating a latch circuit signal corresponding to the stored indication of the in-use battery charging, by a latch circuit operatively connected to the charge level tester; (iv) receiving the latch circuit signal corresponding to the stored indication of the in-use battery charging, and providing an indication of the in-use battery charging to an engine operator during the in-use engine operation, through and following the engine turn-off, by a charge indicator operatively connected to the latch circuit; and (v) measuring voltage of the engine battery, comparing the battery voltage to a predetermined battery voltage level corresponding to engine starting, and sending a first circuit voltage level tester signal to the latch circuit for resetting the latch circuit when the battery voltage is less than the pre-determined battery voltage level corresponding to engine starting, by a first circuit voltage level tester operatively connected to the engine battery; and (b) indicating abnormal battery discharging following engine turn-off, by operation of a second circuit, the operation of the second circuit comprising: (i) sensing battery discharging current, converting the sensed battery discharging current into a voltage proportional to the sensed battery discharging current, and generating a battery discharging signal corresponding to the voltage, by an operatively connected second circuit current sensor; (ii) measuring a magnitude of the battery discharging signal sent by the second circuit current sensor, comparing the battery discharging signal magnitude to at least one pre-determined battery discharging level corresponding to the battery abnormal discharging, and generating a discharge level tester signal proportional to the battery discharging signal magnitude when the battery discharging signal magnitude is greater than the at least one predetermined battery discharging level, by a discharge level tester operatively connected to the second circuit current sensor; (iii) delaying sending of the discharge level tester signal by the discharge level tester until a delay mechanism receives an indication of the engine turn-off and sends a delay mechanism signal corresponding to the indication of the engine turn-off to the discharge level tester, by the delay mechanism operatively connected to the discharge level tester; (iv) receiving the delayed discharge level tester signal corresponding to the battery abnormal discharging, and providing an indication of the battery abnormal discharging to an engine operator following the engine turn-off, by a high discharge indicator operatively connected to the discharge level tester; and (v) measuring the battery voltage, comparing the battery voltage to a pre-determined battery voltage level corresponding to the engine turn-off, and sending a second circuit voltage level tester signal to the delay mechanism when the battery voltage is less than the predetermined battery voltage level corresponding to the engine turn-off, by a second circuit voltage level tester operatively connected to the engine battery.

According to further features in this preferred embodiment of the method described below, the first circuit current sensor operates according to a current sensor mechanism selected from the group consisting of a Hall Effect current sensor mechanism configured externally and immediately parallel to a wire electrically connecting a battery lead to a load of the engine, and a current sensor mechanism electrically connected in series of a wire electrically connecting a battery lead to the load of the engine.

According to still further features in this preferred embodiment of the method described below, the first circuit the in-use battery charging current sensed by the first circuit current sensor corresponds to the battery charging current selected from the group consisting of normal battery charging current and abnormal battery charging current.

According to still further features in this preferred embodiment of the method described below, the first circuit the-pre-determined battery charging level includes a charging level greater than initial battery charging effected by a charging mechanism, the charging mechanism is selected from the group consisting of an alternator and a generator.

According to still further features in this preferred embodiment of the method described below, the first circuit indication of the in-use battery charging provided by the charge indicator appears at a location selected from the group consisting of internal to a part of the engine and external to a part of the engine, the external to a part of; the engine includes internal to a vehicle cabin along a dashboard display, and whereby the indication is of a form selected from the group consisting of a warning signal and a non-warning signal, the warning signal is selected from the group consisting of an audio signal, a visual signal, and an electromagnetic signal, the non-warning signal includes a digital readout.

According to still further features in this preferred embodiment of the method described below, the first circuit the first circuit voltage level tester is connected to the engine battery by a connection selected from the group consisting of a direct electromechanical connection to leads of the battery and an indirect electrical connection to the engine battery, the indirect electrical connection features the first circuit voltage level tester connected in an electrical circuit of the engine selected from the group consisting of internal to a part of the engine and external to the engine.

According to still further features in this preferred embodiment of the method described below, the second circuit the at least one pre-determined battery discharging level corresponding to the battery abnormal discharging is selected from the group consisting of a battery discharging level corresponding to vehicle headlights in an operative mode, a battery discharging level corresponding to vehicle hazard lights in an operative mode, a battery discharging level corresponding to a vehicle anti-theft alarm device in an abnormal operative mode, and a battery discharging level corresponding to at least one vehicle accessory in an abnormal operative mode.

According to still further features in this preferred embodiment of the method described below, the second circuit the indication of the battery abnormal discharging provided by the high discharge indicator appears at a location selected from the group consisting of internal to a part of the engine and external to a part of the engine, the external to a part of the engine includes internal to a vehicle cabin along a dashboard display, and whereby the indication is of a form selected from the group consisting of a warning signal and a non-warning signal, the warning signal selected from the group consisting of an audio signal, a visual signal, and an electromagnetic signal.

According to still further features in this preferred embodiment of the method described below, the second circuit the second circuit voltage level tester is connected to the engine battery by a connection selected from the group consisting of a direct electromechanical connection to leads of the battery and an indirect electrical connection to the engine battery, the indirect electrical connection features the second circuit voltage level tester connected in an electrical circuit of the engine selected from the group consisting of internal to a part of the engine and external to the engine.

According to still further features in this preferred embodiment of the method described below, the method further comprises the step of associating at least one temperature sensor with corresponding at least one component of the first circuit and the second circuit selected from the group consisting of the charge level tester, the discharge level tester, the first circuit voltage level tester, and the second circuit voltage level tester, for measuring ambient temperature in a vicinity of the engine, and wherein the corresponding at least one component varies and is adjustable in relation to the ambient temperature.

According to still further features in this preferred embodiment of the method described below, the first circuit current sensor and the second circuit current sensor are configured, operatively connected, and function as a single current sensor for sensing battery current selected from the group consisting of the in-use battery charging current and the battery discharging current, converting the sensed battery current into a voltage proportional to the sensed battery current, and generating a current sensor signal selected from the group consisting of the in-use battery charging signal and the battery discharging signal, corresponding to the voltage.

According to still further features in this preferred embodiment of the method described below, the first circuit voltage level tester and the second circuit voltage level tester are configured, operatively connected to the engine battery, and function as a single voltage level tester for measuring the battery voltage, comparing the battery voltage to the pre-determined battery voltage levels, sending a corresponding voltage level tester signal to the latch circuit for resetting the latch circuit when the battery voltage is less than the pre-determined battery voltage level corresponding to engine starting, and sending a corresponding voltage level tester signal to the delay mechanism when the battery voltage is less than the pre-determined battery voltage level corresponding to the engine turn-off.

According to another aspect of the present invention, there is provided a method for indicating in-use charging and abnormal discharging of a combustion engine battery following engine turn-off, comprising: (a) indicating in-use battery charging during engine operation, through and following engine turn-off, by operation of a first circuit, the operation of the first circuit comprising: (i) sensing in-use battery charging current, converting the sensed in-use battery charging current into a voltage proportional to the sensed in-use battery charging current, and generating an in-use battery charging signal corresponding to the voltage, by an operatively connected first circuit current sensor; (ii) measuring a magnitude of the in-use battery charging signal sent by the first circuit current sensor, comparing the in-use battery charging signal magnitude to a pre-determined in-use battery charging level, and generating a charge level tester signal proportional to the in-use battery charging signal magnitude when the in-use battery charging signal magnitude is greater than the pre-determined in-use battery charging level, by a charge level tester operatively connected to the first circuit current sensor; (iii) receiving and registering the charge level tester signal sent by the charge level tester as an indication of the in-use battery charging, storing the indication of the in-use battery charging, and generating a latch circuit signal corresponding to the stored indication of the in-use battery charging, by a latch circuit operatively connected to the charge level tester; (iv) receiving the latch circuit signal corresponding to the stored indication of the in-use battery charging, and providing an indication of the in-use battery charging to an engine operator during the in-use engine operation, through and following the engine turn-off, by a charge indicator operatively connected to the latch circuit; and (v) measuring voltage of the engine battery, comparing the battery voltage to a pre-determined battery voltage level corresponding to engine starting, and sending a first circuit voltage level tester signal to the latch circuit for resetting the latch circuit when the battery voltage is less than the pre-determined battery voltage level corresponding to engine starting, by a first circuit voltage level tester operatively connected to the engine battery; and (b) indicating abnormal battery discharging following engine turn-off, by operation of a second circuit, the operation of the second circuit comprising: (i) sensing battery discharging current, converting the sensed battery discharging current into a voltage proportional to the sensed battery discharging current, and generating a battery discharging signal corresponding to the voltage, by an operatively connected second circuit current sensor; (ii) measuring a magnitude of the battery discharging signal sent by the second circuit current sensor, comparing the battery discharging signal magnitude to at least one pre-determined battery discharging level corresponding to the battery abnormal discharging, and generating a discharge level tester signal proportional to the battery discharging signal magnitude when the battery discharging signal magnitude is greater than the at least one pre-determined battery discharging level, by a discharge level tester operatively connected to the second circuit current sensor; (iii) delaying sending of the discharge level tester signal by the discharge level tester until a delay mechanism receives an indication of the engine turn-off and sends a delay mechanism signal corresponding to the indication of the engine turn-off to the discharge level tester, by the delay mechanism operatively connected to the discharge level tester; (iv) receiving the delayed discharge level tester signal corresponding to the battery abnormal discharging, and providing an indication of the battery abnormal discharging to an engine operator following the engine turn-off, by a high discharge indicator operatively connected to the discharge level tester; (v) sensing at least one engine characteristic selected from the group consisting of engine noise and engine vibration, and generating at least one engine characteristic sensor signal corresponding to the at least one engine characteristic, by at least one operatively connected engine characteristic sensor selected from the group consisting of engine noise sensors and engine vibration sensors; and (vi) measuring the at least one engine characteristic sensor signal generated and sent by the at least one engine characteristic sensor, comparing the measurement to at least one corresponding pre-determined threshold level of the at least one engine characteristic for distinguishing between engine operation and engine non-operation, the engine non-operation including the engine turn-off, and sending at least one engine characteristic level tester signal to the delay mechanism when the measurement is less than the at least one corresponding pre-determined threshold level of the at least one engine characteristic corresponding to the engine turn-off, by at least one engine characteristic level tester selected from the group consisting of engine noise level testers and engine vibration level testers operatively connected to the at least one engine characteristic sensor.

According to further features in this preferred embodiment of the method described below, wherein the second circuit the at least one engine characteristic level tester measures the at least one engine characteristic sensor signal as a function of time selected from the group consisting of a continuous function of time and a discontinuous function of time.

According to still further features in this preferred embodiment of the method described below, the method further comprises the step of associating at least one temperature sensor with corresponding at least one component of the first circuit and the second circuit selected from the group consisting of the charge level tester, the discharge level tester, the first circuit voltage level tester, the second circuit voltage level tester, and the at least one engine characteristic level tester, for measuring ambient temperature in a vicinity of the engine, and wherein the at least one component varies and is adjustable in relation to the ambient temperature.

According to another aspect of the present invention, there is provided a method for indicating abnormal discharging of a combustion engine battery following engine turn-off, comprising: (a) sensing battery discharging current, converting the sensed battery discharging current into a voltage proportional to the sensed battery discharging current, and generating a-battery discharging signal corresponding to- the voltage, by an operatively connected current sensor; (b) measuring a magnitude of the battery discharging signal sent by the current sensor, comparing the battery discharging signal magnitude to at least one pre-determined battery discharging level corresponding to the battery abnormal discharging, and generating a discharge level tester signal proportional to the battery discharging signal magnitude when the battery discharging signal magnitude is greater than the at least one pre-determined battery discharging level, by a discharge level tester operatively connected to the current sensor; (c) delaying sending of the discharge level tester signal by the discharge level tester until a delay mechanism receives an indication of the engine turn-off and sends a delay mechanism signal corresponding to the indication of the engine turn-off to the discharge level tester, by the delay mechanism operatively connected to the discharge level tester; (d) receiving the delayed discharge level tester signal corresponding to the battery abnormal discharging, and providing an indication of the battery abnormal discharging to an engine operator following the engine turn-off, by a high discharge indicator operatively connected to the discharge level tester; and (e) measuring the battery voltage, comparing the battery voltage to a pre-determined battery voltage level corresponding to the engine turn-off, and sending a voltage level tester signal to the delay mechanism when the battery voltage is less than the pre-determined battery voltage level corresponding to the engine turn-off, by a voltage level tester operatively connected to the engine battery.

According to another aspect of the present invention, there is provided a method for indicating abnormal discharging of a combustion engine battery following engine turn-off, comprising: (a) sensing battery discharging current, converting the sensed battery discharging current into a voltage proportional to the sensed battery discharging current, and generating a battery discharging signal corresponding to the voltage, by an operatively connected current sensor; (b) measuring a magnitude of the battery discharging signal sent by the current sensor, comparing the battery discharging signal magnitude to at least one pre-determined battery discharging level corresponding to the battery abnormal discharging, and generating a discharge level tester signal proportional to the battery discharging signal magnitude when the battery discharging signal magnitude is greater than the at least one pre-determined battery discharging level, by a discharge level tester operatively connected to the current sensor; (c) delaying sending of the discharge level tester signal by the discharge level tester until a delay mechanism receives an indication of the engine turn-off and sends a delay mechanism signal corresponding to the indication of the engine turn-off to the discharge level tester, by the delay mechanism operatively connected to the discharge level tester; (d) receiving the delayed discharge level tester signal corresponding to the battery abnormal discharging, and providing an indication of the battery abnormal discharging to an engine operator following the engine turnoff, by a high discharge indicator operatively connected to the discharge level tester; (e) sensing at least one engine characteristic selected from the group consisting of engine noise and engine vibration, and generating at least one engine characteristic sensor signal corresponding to the at least one engine characteristic, by at least one operatively connected engine characteristic sensor selected from the group consisting of engine noise sensors and engine vibration sensors; and (f) measuring the at least one engine characteristic sensor signal generated and sent by the at least one engine characteristic sensor, comparing the measurement to at least one corresponding pre-determined threshold level of the at least one engine characteristic for distinguishing between engine operation and engine non-operation, the engine non-operation including the engine turn-off, and sending at least one engine characteristic level tester signal to the delay mechanism when the measurement is less than the at least one corresponding pre-determined threshold level of the at least one engine characteristic corresponding to the engine turn-offs by at least one engine characteristic level tester selected from the group consisting of engine noise level testers and engine vibration level testers operatively connected to the at least one engine characteristic sensor.

Implementation and operation of the device and method of the present invention involve performing or completing selected tasks or steps manually, automatically, or a combination thereof. Moreover, according to actual instrumentation and equipment of the preferred embodiments of the device, several selected steps of the method could be implemented by appropriate hardware or software or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method of the invention could be described as being performed by a data processor, such as a computing platform for executing a plurality of instructions.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
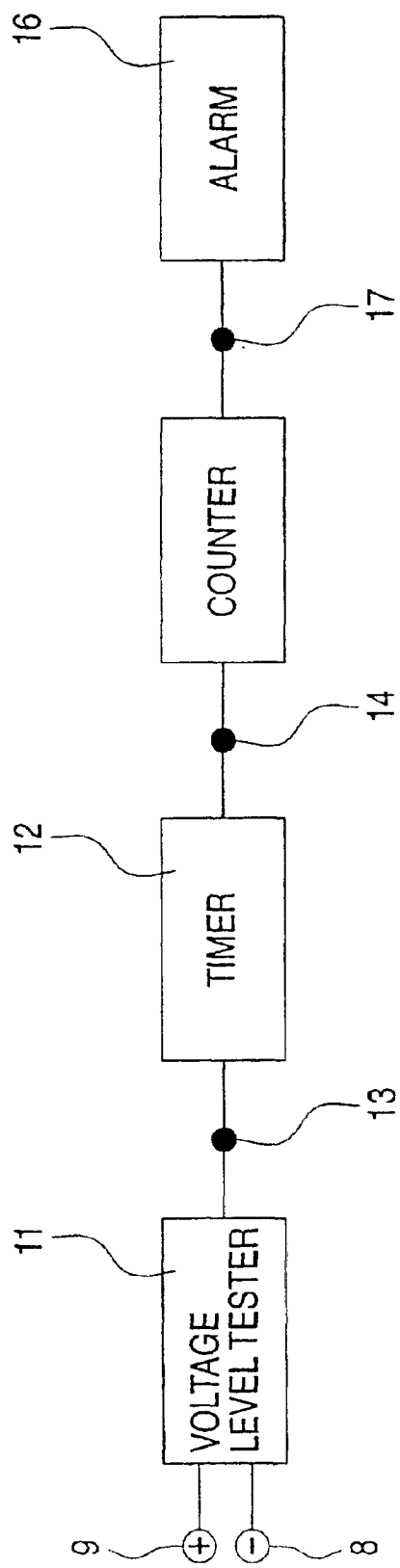
FIG. 1 is a block diagram of a prior art device, constructed and operative according to the teachings of U.S. Pat. No. 5,818,333.

The present invention relates to a device and corresponding method for indicating in-use charging and abnormal discharging of a combustion engine battery following engine turn-off.

The device and method of the present invention are based on the novel cooperative operation of a current sensor, a charge level tester, a latch circuit, a charge indicator, and a voltage level tester, in a first circuit for detecting, measuring, indicating, and storing an indication of in-use normal or abnormal battery charging during engine operation and through engine turn-off, and cooperative operation of the current sensor, a discharge level tester, a delay mechanism, a high discharge indicator, and the voltage level tester, in a second circuit for detecting, measuring, and indicating high or abnormal battery discharging following engine turn-off.

In the second circuit, the delay mechanism receives a signal from the voltage level tester for indicating engine turn-off. In alternative embodiments of the second circuit, the delay mechanism receives a signal from operation of a noise and/or vibration sensor and a noise and/or vibration level tester, for indicating engine turn-off.

In each of the preferred embodiments of the present invention, optionally, a device for warning of combustion engine battery deterioration by providing a warning signal of battery deterioration during engine starting, or, during engine starting and following engine turn-off, is included as an additional circuit, operating independently from both the first circuit and the second circuit.

Optional addition of a device for warning of combustion engine battery deterioration as an additional circuit in the device of the present invention serves to detect and warn of a problem with the starter mechanism in general, and of a problem with the voltage level of the battery in particular, during engine starting, or, during engine starting and following engine turn-off. The presence of the starter mechanism warning device appropriately complements operation of the first and second circuits in the device for indicating in-use charging and/or discharging of a combustion engine battery during and following engine turn-off.

Thus, in this additional preferred embodiment of the present invention, a device and corresponding method are provided for detecting and indicating a problem with the charge state and charging state of the battery during engine starting, during steady state engine operation, during engine turn-off, and following engine turn-off.

It is to be understood that the invention is not limited in its application to the details of construction, arrangement, and composition of the components set forth in the following description or drawings. The invention is capable of other embodiments or of being practiced or carried out in various ways. For example, any number of the electronic components or elements featured or included in the following described embodiments may be either digital or analog, operatively connected and functioning in a corresponding digital, logical, or analog mode. Moreover, any connection among any number of the electronic components or elements of the device may be formed by using direct or mechanical means, or, by using indirect or electrical means such as in a circuit of the overall vehicle electrical system, where a mechanical or electrical connection may be internal or external to the engine compartment. Also, it is to be understood that the phraseology and terminology employed herein are for the purpose of description and should not be regarded as limiting.

Components, operation, and implementation of a device and method for indicating in-use charging and abnormal discharging of a combustion engine battery during and following engine turn-off, according to the present invention are better understood with reference to the drawings and the accompanying description.

Figure 3:
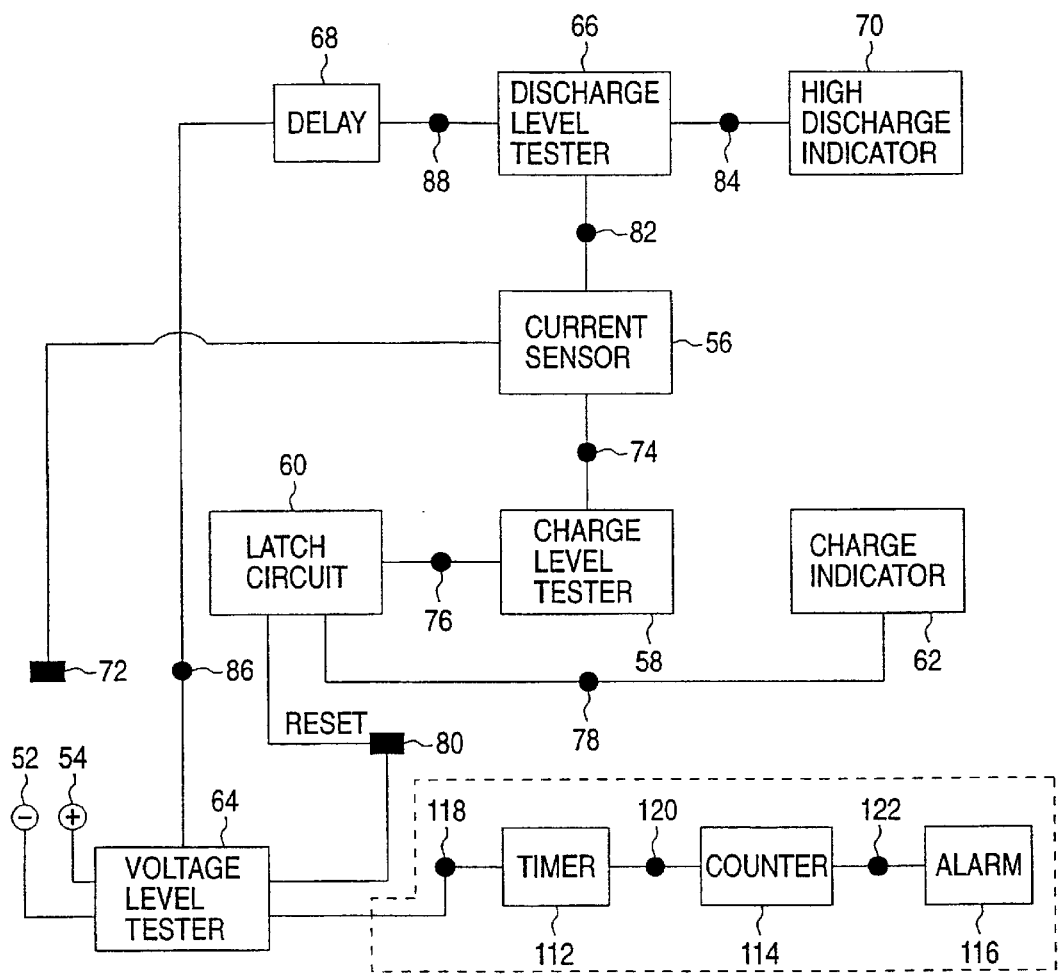
FIG. 3 is a block diagram illustrating a preferred embodiment of a device for indicating in-use charging and abnormal discharging of a combustion engine battery following engine turn-off in accordance with the present invention.

Referring now to the drawings, FIG. 3 is a block diagram illustrating a preferred embodiment of the device, generally designated 50, constructed and operative for indicating in-use charging and abnormal discharging of a combustion engine battery following engine turn-off, in accordance with the following accompanying method of the present invention. Device 50 is, preferably, permanently connected to negative and positive battery leads, 52 and 54, respectively, and operates on the principle that the battery (not shown) initially supplies a large current to the starter mechanism (not shown) of the combustion engine, followed by battery charging by a charging mechanism including components such as an alternator, during engine operation, and possibly followed by abnormal battery discharging following engine turn-off. Device 50 automatically and continuously checks the power of the battery, from the time the starter mechanism is activated or energized, such as by turning a key, for initiating cranking of the motor crankshaft, during and following engine turn-off, and through the next starting of the engine.

Device 50 features (a) a first circuit for indicating in-use battery charging during engine operation, and, during and following engine turn-off, including (i) a current sensor 56, (ii) a charge level tester 58, (iii) a latch circuit 60, (iv) a charge indicator 62, and (v) a voltage level tester 64, and, (b) a second circuit for indicating battery discharging following engine turn-off, including (i) current sensor 56, (ii) a discharge level tester 66, (iii) a delay mechanism 68, (iv) a high discharge indicator 70, and (v) voltage level tester 64. In addition, device 50 includes battery negative and positive leads 52 and 54, respectively, and corresponding circuit junctions 72, 74, 76, 78, 80, 82, 84, 86, and 88.

The starter mechanism of the engine operates in relation to an electrically and mechanically varying load, where the load features a varying combination of electrical and mechanical loads, including the vehicle battery, starter motor, motor crankshaft, coil, and any other vehicle component or accessory which may electrically and/or mechanically influence or be connected to the same load. Prior to activation and turning of the starter motor, the electromechanical load of the circuit is relatively low. During activation and turning of the starter motor via current supplied by the battery, the electromechanical load increases accordingly, along with a corresponding change in battery charging and battery voltage, measured by current sensor 56 and by voltage level tester 64, respectively.

Current sensor 56 senses charging current or discharging current of the battery. In general, current sensor 56 may feature any appropriate mechanism, and be appropriately electrically configured, for sensing charging or discharging current of the battery. As a first example, current sensor 56 features a 'Hall Effect' sensor mechanism, and accordingly, is configured external and immediately parallel to a wire or cable electrically connecting one of battery leads 52 or 54 to the engine load. As a second example, current sensor 56 is configured in series of a wire or cable electrically connecting one of battery leads 52 or 54 to the engine load. The mechanism of current sensor 56 is capable of converting charging or discharging current it senses into a voltage proportional to that current, and sending a signal of the proportional voltage to charge level tester 58 and to discharge level tester 66. In FIG. 3, these exemplary electrical configurations of current sensor 56 are generally indicated by circuit junction 72.

Operation of the first circuit for indicating in-use normal or abnormal battery charging, following engine turn-off is described as follows. At the instant of engine starting, current sensor 56 senses no battery charging, or actually battery discharging due to the load of activation of the starting mechanism, as the battery charging mechanism (not shown), including an alternator or generator, has not yet come to a state of normal battery charging. Current sensor 56 sends a battery charging signal of this normal no battery charging to charge level tester 58 via circuit junction 74. This signal is in the form of a voltage proportional to the current corresponding to no battery charging.

Charge level tester 58 measures the magnitude of a battery charging signal sent by current sensor 56, and compares the battery charging signal to a predetermined battery charging level. An exemplary pre-determined battery charging level corresponds to a charging level greater than initial battery charging by the charging mechanism during or following engine starting, such as that corresponding to a state of normal battery charging during engine operation, according to engine operating information and/or data supplied by the engine manufacturer. The instant the battery charging signal magnitude is greater than the pre-determined battery charging level, charge level tester 58 sends a signal, in the form of a voltage proportional to the battery charging signal magnitude, to latch circuit 60 via circuit junction 76.

During engine starting, battery charging signal magnitude is less than the pre-determined battery charging level. Moreover, for a time period following engine starting, under normal operating conditions of a combustion engine, the battery charging mechanism still has not yet attained a state of normal battery charging, and the battery charging signal magnitude is still less than the pre-determined battery charging level. As such, during and for a time period following engine starting, no signal is sent by charge level tester 58 to latch circuit 60.

Once the battery charging mechanism has attained a state of operation for charging the battery, current sensor 56 senses in-use normal or abnormal battery charging. Current sensor 56 sends a battery charging signal of this normal or abnormal battery charging to charge level tester 58 via circuit junction 74. This signal is in the form of a voltage proportional to the current corresponding to normal or abnormal battery charging.

Charge level tester 58 measures the magnitude of the normal or abnormal battery charging signal sent by current sensor 56, and compares the battery charging signal to the pre-determined battery charging level. During engine charging conditions, including conditions of normal, or, abnormal such as less than normal or low battery charging, the battery charging signal magnitude is greater than the pre-determined battery charging level, and charge level tester 58 sends a signal, in the form of a voltage proportional to the normal or abnormal battery charging signal magnitude, to latch circuit 60 via circuit junction 76.

Latch circuit 60, also commonly known as a flip-flop circuit, is included in the first circuit of device 50, functioning by receiving and registering the in-use normal or abnormal battery charging signal magnitude sent by charge level tester 58 as an indication of either normal or abnormal battery charging, remembering or storing the indication of either normal or abnormal battery charging, and sending a signal corresponding to the stored indication of normal or abnormal battery charging to charge indicator 62 via circuit junction 78.

Latch circuit 60 registers and stores the indication of normal or abnormal battery charging according to one of two corresponding logical values, '1' or '0', respectively. The first logical value of '1' corresponds to normal battery charging during engine operation, and the second logical value of '0' corresponds to abnormal battery charging during engine operation. Latch circuit 60 stores the indication of in-use normal or abnormal battery charging during engine operation, during and following engine turn-off, until this indication is reset by operation of a reset step or mechanism, for example, by voltage level tester 64 detecting a voltage drop corresponding to activation of the starter mechanism of the engine, featured as part of operation of the first circuit in device 50, and further described below.

The novelty of the first circuit for monitoring in-use battery charging, is that from the instant of registering the normal or abnormal battery charging signal magnitude sent by charge level tester 58 as an indication of either normal or abnormal battery charging, latch circuit 60 continuously remembers or stores the indication of in-use normal or abnormal battery charging, as value '1' or '0', respectively, and sends a signal, in the form of a voltage, corresponding to the indication of either normal or abnormal battery charging to charge indicator 62 via circuit junction 78, during engine operation, and, during and following engine turn-off.

Charge indicator 62 provides an indication of in-use normal or abnormal battery charging to an engine operator. Preferably, the indication of in-use normal or abnormal battery charging is in the form of a read-out appearing on a display device, conveniently located in the engine compartment, for reading by the engine operator, either during engine operation, or following engine turn-off For example, in the case of a vehicle, the engine operator may decide to park the vehicle on the side of a road, leave the engine on, and examine the read-out while the engine is still operating, or the engine operator may decide to turn off the engine, and examine the read-out following engine turn-off. Optionally, the indication of in-use normal or abnormal battery charging may also be appear on the dashboard display inside the vehicle cabin, for reading by the engine operator during engine operating and/or following engine turn-off.

Voltage level tester 64 is connected to battery leads 52 and 54, forming a direct or mechanical connection, or, an indirect or electrical connection such as in a circuit of the overall vehicle electrical system, where the electrical connection may be internal or external to the engine compartment. Voltage level tester 64 functions by measuring a voltage across the battery at any instant of time, including before engine starting, during engine starting, during engine operation, during and following engine turn-off. Voltage level tester 64 also functions to activate resetting of latch circuit 60 via circuit junction 80 during activation of the starter mechanism.

At the instant.of starting the vehicle motor, voltage level tester 64 senses activation of the starter mechanism. Voltage level tester 64 then measures the voltage across battery poles 52 and 54, and compares this voltage to a predetermined level. An exemplary pre-determined level corresponds to a battery voltage following activation of the starter mechanism, normally higher than battery voltage existing during activation of the starter mechanism. This measurement is done while the starter motor, connected to the battery, turns.

During this time interval of connection of the starter motor to the battery, there is concurrently a sharp drop in voltage across battery poles 52 and 54. Voltage level tester 64 identifies this sharp drop in battery voltage, and sends a signal via circuit junction 80 for resetting latch circuit 60 to logic value '0'. Regardless of the previously registered value, '1' or '0', of in-use normal or abnormal battery charging by latch circuit 60, activation of the starter mechanism initiates the step or mechanism for resetting latch circuit 60 to logic value '0'. Resetting latch circuit 60 enables renewed monitoring, registering, and indicating in-use normal or abnormal battery charging during engine operation, and storing the indication of in-use normal or abnormal battery charging during and following engine turn-off, until the next event of activating the starter mechanism -and concurrent resetting of latch circuit 60.

Operation of the second circuit for indicating abnormal battery discharging following engine turn-off is described as follows, referring again to FIG. 3. During engine operation, including from the instant of activating the engine starter mechanism through the instant of turning off the engine, any sensing of battery discharging current by current sensor 56 is sent, in the form of a voltage signal proportional to the discharging current, to discharge level tester 66 via circuit junction 82.

Discharge level tester 66 measures the magnitude of a battery discharging signal sent by current sensor 56, and compares the battery discharging signal to at least one, preferably several, pre-determined battery discharging levels. Exemplary pre-determined battery discharging levels include one or more discharging levels corresponding to lights, such as headlights or hazard warning lights, accidentally or intentionally left on by an engine operator following engine turn-off, or a discharging level corresponding to a vehicle anti-theft alarm device improperly functioning following engine turn-off. In the case of lights left on following engine turn-off, the pre-determined battery discharging level corresponding to leaving headlights on is greater than the pre-determined battery discharging level corresponding to an improperly functioning vehicle anti-theft alarm device. In each case, there exists an approximately known level of high or abnormal battery discharging, due to discharging battery current following engine turn-off, according to available engine operating information and/or data.

The instant the battery discharging signal magnitude is greater than one of the pre-determined battery discharging levels, corresponding to high or abnormal battery discharging, discharge level tester 66 sends a signal, in the form of a voltage proportional to the high or abnormal battery discharging signal magnitude, to high discharge indicator 70 via circuit junction 84, but, only on the condition that a delay mechanism 68 previously receives an indication of engine turn-off, and subsequently forwards this indication of engine turn-off to discharge level tester 66 via circuit junction 88. Engine turn-off is caused either intentionally by the engine operator turning off the engine, or, unintentionally by a spontaneous engine failure or outage.

The novelty of the second circuit in device 50 is that of enabling monitoring and indicating high or abnormal battery discharging following engine turn-off. Indication of engine turn-off is effected by delay mechanism 68 receiving a signal of a battery voltage less than a pre-determined level, detected, measured, and sent by voltage level tester 64 to delay mechanism 68 via circuit junction 86, and subsequently delay mechanism 68 forwards this indication of engine turn-off to discharge level tester 66 via circuit junction 88.

An exemplary pre-determined level of battery voltage measured by voltage level tester 64 is that sufficiently less than a battery voltage existing during activation of the starter mechanism, when during normal operating conditions of a combustion engine, battery voltage is normally at a minimum level, followed by the process of battery charging by the charging mechanism, and prior to an additional drop in battery voltage during and following engine turn-off. In setting the pre-determined level of battery voltage for effecting the indication of engine turn-off, the objective is to prevent voltage level tester 64 from sending a signal of low battery voltage to delay mechanism 68 during engine starting, such that the signal would wrongly indicate engine turn-off to delay mechanism 68. Moreover, delay mechanism 68 functions by delaying the sending of a signal of low battery voltage by voltage level tester 64 directly to discharge level tester 66, in order to assure fulfilling the condition of complete engine turn-off.

High discharge indicator 70 provides at least one type of indication of high or abnormal battery discharging to an engine operator following engine turn-off. Each type of indication of high or abnormal battery charging is in the form of a digital or analog read-out appearing on a digital or analog display device, conveniently located internal to the engine compartment and/or external to the engine compartment such as in the case of a vehicle, inside the vehicle cabin along the dashboard display, for reading by the engine operator, following engine turn-off.

For the case that discharge level tester 66 operates with a plurality of pre-determined battery discharging levels, as described above, high discharge indicator 70 is capable of providing a plurality of indications of high or abnormal battery discharging following engine turn-off. A different indication of high or abnormal battery discharging following engine turn-off is provided by high discharge indicator 70, according to a different cause of high or abnormal battery discharging following engine turn-off, including headlights or hazard warning lights left on, or an improperly functioning vehicle anti-theft alarm device.

In device 50, the first circuit for indicating in-use battery charging during engine operation, and, during and following engine turn-off, and the second circuit for indicating battery discharging following engine turn-off, optionally, each feature a separate current sensor 56, and a separate voltage level tester 64, thereby enabling totally independent operation of each respective circuit with separate circuit components.

In an alternative preferred embodiment of device 50 and corresponding method for indicating in-use charging and abnormal discharging of a combustion engine battery following engine turn-off, at least one engine characteristic sensor, where an engine characteristic sensor includes engine noise and/or engine vibration sensor, and at least one corresponding engine characteristic level tester, including engine noise and/or vibration level tester, are included in the second circuit of device 50 of FIG. 3, for effecting indication of engine turn-off provided to a delay mechanism, instead of using voltage level tester 64 for effecting indication of engine turn-off to delay mechanism 68 via circuit junction 86, as described above. All other related mechanisms, components, features, and methods of operation of this preferred embodiment, are the same as those described for device 50 of FIG. 3.

Figure 4:
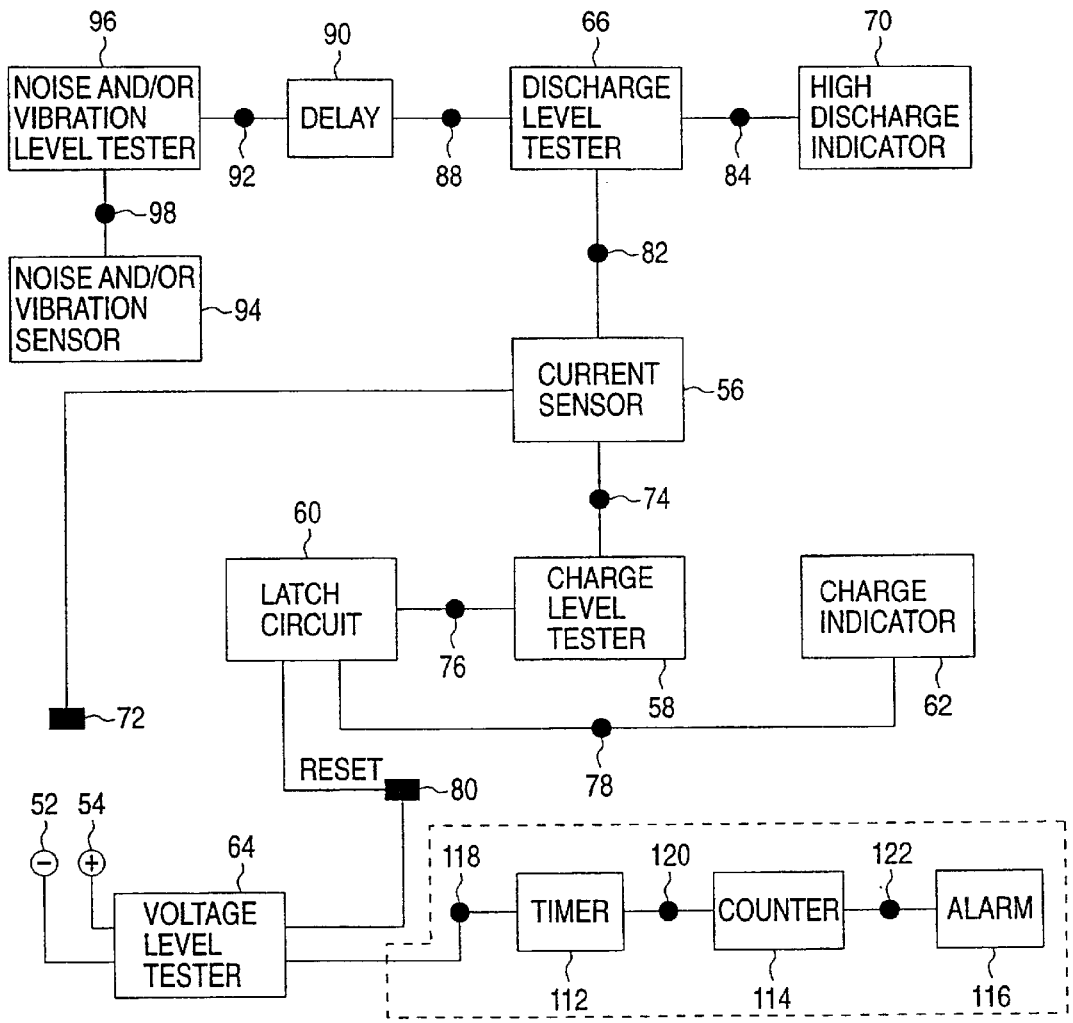
FIG. 4 is a block diagram illustrating an alternative preferred embodiment of a device for indicating in-use charging and abnormal discharging of a combustion engine battery following engine turn-off, featuring an engine noise and/or vibration sensor and level tester, in accordance with the present invention.

FIG. 4 is a block diagram illustrating this preferred embodiment, with device 100 for indicating in-use charging and discharging of a combustion engine battery following engine turn-off featuring engine noise and/or vibration sensor 94 and engine noise and/or vibration level tester 96. Device 100 features (a) a first circuit for indicating in-use battery charging during engine operation, and, during and following engine turn-off, including (i) a current sensor 56, (ii) a charge level tester 58, (iii) a latch circuit 60, (iv) a charge indicator 62, and (v) a voltage level tester 64, and, (b) a second circuit for indicating battery discharging following engine turn-off, including (i) current sensor 56, (ii) a discharge level tester 66, (iii) at least one engine noise and/or vibration sensor 94, (iv) at least one engine noise and/or vibration level tester 96, (v) a delay mechanism 90, and (vi) a high discharge indicator 70. In addition, device 100 includes battery negative and positive leads 52 and 54, respectively, and corresponding circuit junctions 72, 74, 76, 78, 80, 82, 84, 88, 92, and 98.

As herein described below, noise and/or vibration sensor 94, and noise and/or vibration level tester 96, function in the circuit of device 100, by detecting and measuring engine noise and/or engine vibration, respectively, including the condition of sufficiently low engine noise and/or engine vibration corresponding to a condition of engine turn-off, and by sending a corresponding indication of engine turn-off to delay mechanism 90 via circuit junction 92.

Noise and/or vibration sensor 94 is preferably, but not limited to, continuously in an active mode, similar to the continuous active mode of current sensor 56 and voltage level tester 64, and preferably, but not limited to, continuously senses noise and/or vibration of the engine. For the engine in a non-activated mode, such as when the starter mechanism or engine is not activated, noise and/or vibration sensor 94 senses noise and/or vibration less than a pre-determined threshold level corresponding to engine turn-off. For the engine in an activated mode, such as during activation of the starter mechanism or during subsequent running of the engine, noise and/or vibration sensor 94 senses noise and/or vibration greater than a pre-determined threshold level. According to the state of the engine, running or not, noise and/or vibration sensor 94 preferably, but not limited to, continuously sends a corresponding engine noise and/or vibration sensor signal to noise and/or vibration level tester 96 via circuit junction 98. When noise and/or vibration level tester 96 determines the level of engine noise and/or vibration to be less than the threshold corresponding to the condition of engine turn-off, a corresponding, continuous or discontinuous, noise and/or vibration level tester signal is sent to delay mechanism 90 via circuit junction 92.

In device 100, delay mechanism 90 functions by delaying the sending of a signal corresponding to a condition of engine turn-off by engine noise and/or vibration level tester 96 directly to discharge level tester 66, in order to assure fulfilling a condition of complete engine turn-off. Following fulfilling a condition of engine turn-off, delay mechanism 90 sends the indication of engine turn-off to discharge level tester 66 via circuit Junction 88. Thereafter, the instant the magnitude of battery discharging signal, determined by discharge level tester 66, and sent by current sensor 56 to discharge level tester 66, is greater than one of the pre-determined battery discharging levels, corresponding to high or abnormal battery discharging, discharge level tester 66 sends a signal, in the form of a voltage proportional to the high or abnormal battery discharging signal magnitude, to high discharge indicator 70 via circuit junction 84. High discharge indicator 70 then provides at least one type of indication of high or abnormal battery discharging to an engine operator following engine turn-off, as previously described for operation of device 50.

In device 100, the first circuit for indicating in-use battery charging during engine operation, and, during and following engine turn-off, and the second circuit for indicating battery discharging following engine turn-off, optionally, each feature a separate current sensor 56, and a separate voltage level tester 64, thereby enabling totally independent operation of each respective circuit with separate circuit components.

In another preferred embodiment of the present invention, there is provided a device and corresponding method for indicating abnormal discharging of a combustion engine battery following engine turn-off, without inclusion of a circuit for indicating battery charging as is provided in the previously described embodiments of the present invention shown in FIGS. 3–4.

Figure 5:
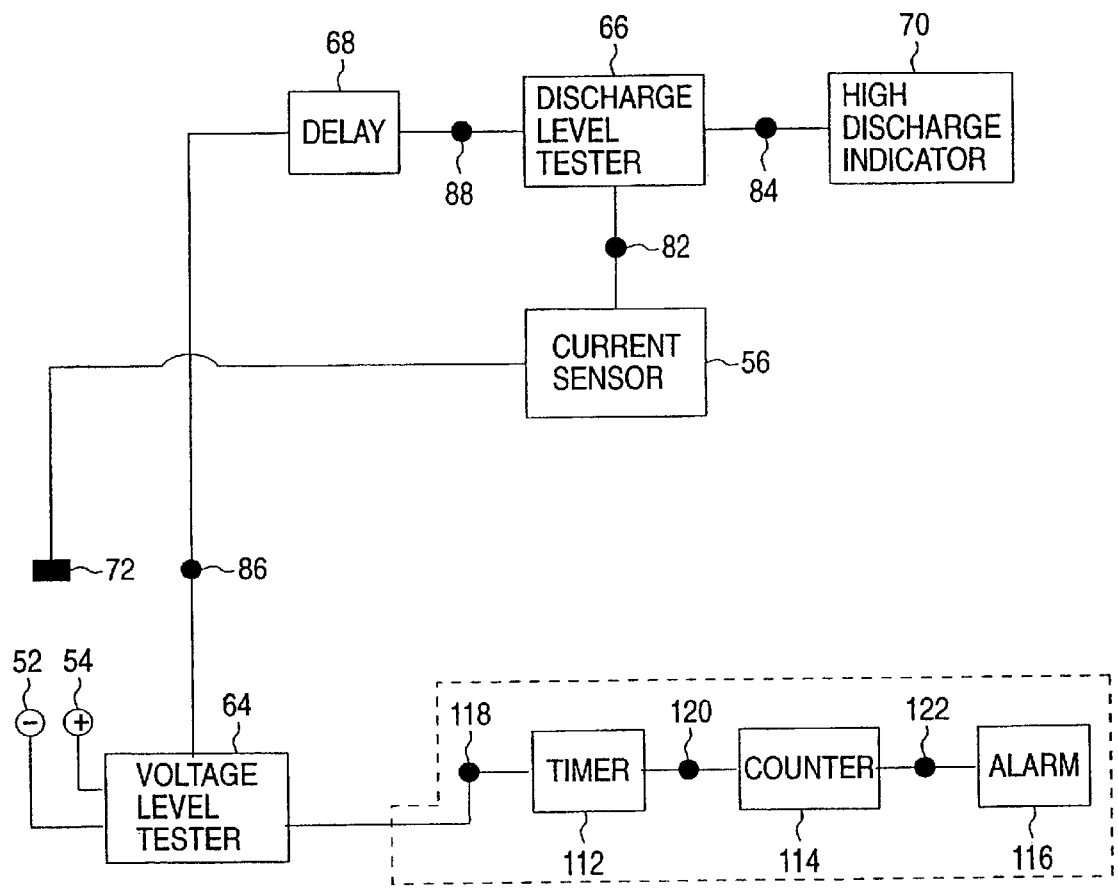
FIG. 5 is a block diagram illustrating a preferred embodiment of a device for indicating abnormal discharging of a combustion engine battery following engine turn-off, in accordance with the present invention.

FIG. 5 is a block diagram illustrating this preferred embodiment of device 102, for indicating abnormal discharging of a combustion engine battery following engine turn-off. Device 102 features a circuit for indicating battery discharging following engine turn-off, including (i) a current sensor 56, (ii) a discharge level tester 66, (iii) a delay mechanism 68, (iv) a high discharge indicator 70, and (v) a voltage level tester 64. In addition, device 102 includes battery negative and positive leads 52 and 54, respectively, and corresponding circuit junctions 72, 82, 84, and 88. These and all other related mechanisms, components, features, and methods of operation of this preferred embodiment, are the same as those described in relation to the second circuit of device 50 of FIG. 3.

In an alternative preferred embodiment of device 102 of FIG. 5 and corresponding method for indicating discharging of a combustion engine battery following engine turn-off, at least one engine characteristic sensor, where an engine characteristic sensor includes engine noise and/or engine vibration sensor, and at least one corresponding engine characteristic level tester, including engine noise and/or vibration level tester, are included in the circuit of device 102, for effecting indication of engine turn-off provided to a delay mechanism, instead of using voltage level tester 64 for effecting indication of engine turn-off to delay mechanism 68 via circuit junction 86, as described above.

Figure 6:
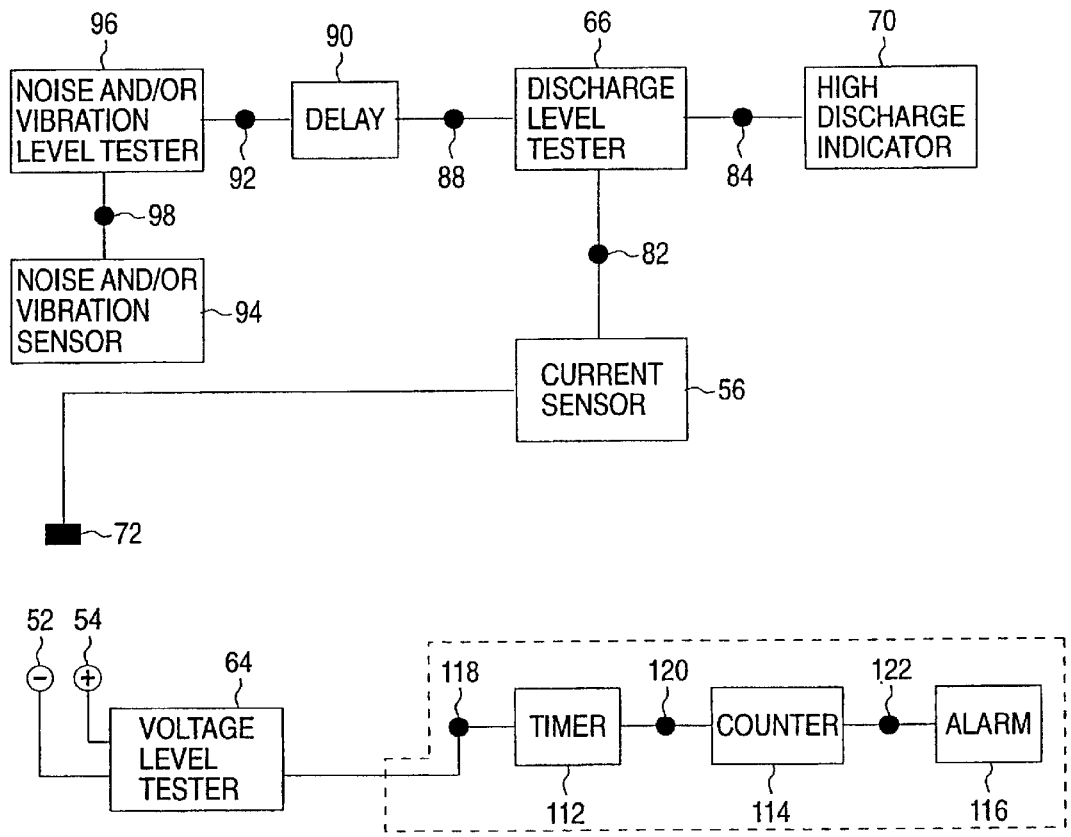
FIG. 6 is a block diagram illustrating an alternative preferred embodiment of a device for indicating abnormal discharging of a combustion engine battery following engine turn-off, featuring an engine noise and/or vibration sensor and level tester, in accordance with the present invention.

FIG. 6 is a block diagram illustrating this preferred embodiment, with device 104 for indicating discharging of a combustion engine battery following engine turn-off, featuring engine noise and/or vibration sensor 94 and engine noise and/or vibration level tester 96. Device 104 features a circuit for indicating battery discharging following engine turn-off, including (i) current sensor 56, (ii) a discharge level tester 66, (iii) at least one engine noise and/or vibration sensor 94, (iv) at least one engine noise and/or vibration level tester 96, (v) a delay mechanism 90, and (vi) a high discharge indicator 70. In addition, device 104 includes battery negative and positive leads 52 and 54, respectively, and corresponding circuit junctions 72, 82, 84, 88, 92, and 98. These and all other related mechanisms, components, features, and methods of operation of this preferred embodiment, are the same as those described in relation to the second circuit of device 100 of FIG. 4.

As previously indicated, there is optional addition of a combustion engine battery deterioration warning device, generally shown in each preferred embodiment, FIGS. 3–6, by the dashed box referenced as 110, as an additional third circuit in device 50 of FIG. 3 and device 100 of FIG. 4, or, as an additional second circuit in device 102 of FIG. 5 and device 104 of FIG. 6, of the present invention. Device 110 serves to detect and warn of a problem with the starter mechanism in general, and of a problem with the voltage level of the battery in particular, during engine starting, or, during engine starting and following engine turn-off, according to the components and operation of a particular combustion engine battery deterioration warning device 110.

In principle, any combustion engine battery deterioration warning device may be included as device 110 as an optional additional circuit in each preferred embodiment of the device and method of the present invention. Two examples of device 110 include device 10 of FIG. 1, as disclosed by Yaffe et al., in U.S. Pat. No. 5,818,333, which is incorporated by reference for all purposes as if fully set forth herein, and device 40 of FIG. 2, as disclosed by Zur et al., in U.S. patent application Ser. No. 09/404,832, which is incorporated by reference for all purposes as if fully set forth herein.

Figure 2:
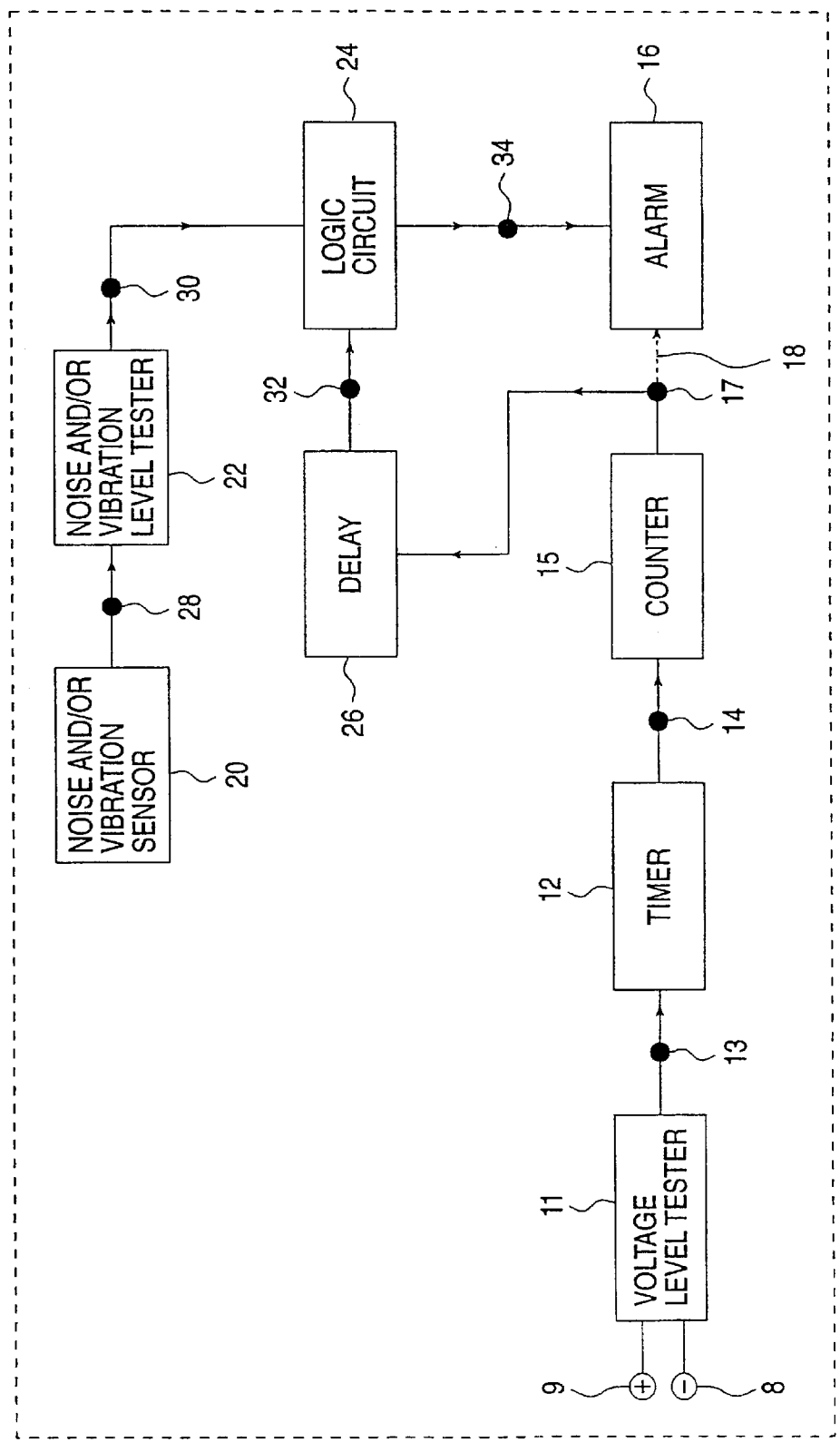
FIG. 2 is a block diagram of another device, constructed and operative according to the teachings of U.S. patent application Ser. No. 09/404,832, illustrating an improved device for warning of deterioration of a starter mechanism of a combustion engine.

For illustrative purposes, device 10 as previously described above, and in the cited reference, and shown in FIG. 1, is included as optional additional circuit 110 in each preferred embodiment of the device and method of the present invention. Optional additional circuit 110 includes (a) voltage level tester 64 for continuously measuring, either directly or indirectly, a voltage across battery terminals 52 and 54 at the end of a given engine starting time interval, (b) a timer 112 responsive to activation of a starter mechanism to time the given engine starting time interval, (c) a counter 114 for maintaining a cumulative or incremental count of occasions on which the battery voltage is below a given level, and (d) an alarm unit 116 for providing a warning signal, in at least one of the forms including an audible alarm, a visual signal, or an electromagnetic signal, when the cumulative or incremental count exceeds a pre-determined number of counts, following activation of the starter mechanism or engine, and (e) corresponding circuit junctions 118, 120, and 122.

Device or additional circuit 110, in each of the preferred embodiments of the device of the present invention, is preferably, but not limited to, electrically connected to same voltage level tester 64 via circuit junction 118, but, operation of device 110 is independent of each of the circuits for indicating in-use charging and/or abnormal discharging of a combustion engine battery following engine turn-off.

An optional feature in each of the above described preferred embodiments of the device and method of the present invention is for inclusion of at least one temperature sensor (not shown) operatively configured and connected to one or more components of each device 50, 100, 102, and 104. Including this feature, charge level tester 58, and/or discharge level tester 66, are each responsive to a temperature sensor by automatically setting pre-determined charging levels and/or discharging levels, respectively, according to a selected reference temperature, such as ambient temperature. Alternatively or additionally, voltage level tester 64 is responsive to a temperature sensor by automatically setting pre-determined voltage levels according to a selected reference temperature, such as ambient temperature. Alternatively or additionally, at least one engine noise and/or vibration level tester 96 is responsive to a corresponding at least one temperature sensor by automatically setting pre-determined engine noise and/or vibration threshold levels according to a selected reference temperature, such as ambient temperature. Alternatively or additionally, timer 112 is responsive to a temperature sensor by automatically setting the pre-determined time interval according to a selected reference temperature, such as ambient temperature.

The above described preferred embodiments of the device and method of the present invention successfully overcome limitations of presently available devices and methods for monitoring the charging state of a combustion engine battery by providing an engine operator, in a safe, effective, and flexible manner, indication of in-use normal or abnormal battery charging, and/or of abnormal battery discharging, following engine turn-off. Moreover, the presence and operation of optional combustion engine battery deterioration warning device 110 appropriately complements operation of preferred embodiments of the device of the present invention. Thus, in these additional preferred embodiments of the present invention, a device and corresponding method are provided for detecting and indicating a problem with the charge and charging state of the battery during engine starting, during steady state engine operation, during engine turn-off, and following engine turn-off. From an advantageous practical viewpoint, an operator of a combustion engine is now provided with wrap-around electrical monitoring of the battery from engine starting through and following engine turn-off, until the engine is again started.

While the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A device for indicating in-use charging and abnormal discharging of a combustion engine battery following engine turn-off, comprising:

(a) a first circuit for the indicating in-use battery charging during engine operation, through and following engine turn-off, said first circuit comprising:

(i) a first circuit current sensor operatively connected for sensing in-use battery charging current, converting said sensed in-use battery charging current into a voltage proportional to said sensed in-use battery charging current, and generating an in-use battery charging signal corresponding to said voltage;

(ii) a charge level tester operatively connected to said first circuit current sensor for measuring a magnitude of said in-use battery charging signal sent by said first circuit current sensor, comparing said in-use battery charging signal magnitude to a pre-determined in-use battery charging level, and generating a charge level tester signal proportional to said in-use battery charging signal magnitude when said in-use battery charging signal magnitude is greater than said pre-determined in-use battery charging level;

(iii) a latch circuit operatively connected to said charge level tester for receiving and registering said charge level tester signal sent by said charge level tester as an indication of the in-use battery charging, storing said indication of the in-use battery charging, and generating a latch circuit signal corresponding to said stored indication of the in-use battery charging;

(iv) a charge indicator operatively connected to said latch circuit for receiving said latch circuit signal corresponding to said stored indication of the in-use battery charging, and providing an indication of said in-use battery charging to an engine operator during the in-use engine operation, through and following the engine turn-off; and (v) a first circuit voltage level tester operatively connected to the engine battery for measuring voltage of the engine battery, comparing said battery voltage to a pre-determined battery voltage level corresponding to engine starting, and sending a first circuit voltage level tester signal to said latch circuit for resetting said latch circuit when said battery voltage is less than said pre-determined battery voltage level corresponding to engine starting; and (b) a second circuit for the indicating abnormal battery discharging following engine turn-off, said second circuit comprising:

(i) a second circuit current sensor operatively connected for sensing battery discharging current, converting said sensed battery discharging current into a voltage proportional to said sensed battery discharging current, and generating a battery discharging signal corresponding to said voltage;

(ii) a discharge level tester operatively connected to said second circuit current sensor for measuring a magnitude of said battery discharging signal sent by said second circuit current sensor, comparing said battery discharging signal magnitude to at least one pre-determined battery discharging level corresponding to the battery abnormal discharging, and generating a discharge level tester signal proportional to said battery discharging signal magnitude when said battery discharging signal magnitude is greater than said at least one pre-determined battery discharging level;

(iii) a delay mechanism for delaying sending of said discharge level tester signal by said discharge level tester until said delay mechanism receives an indication of the engine turnoff and sends a delay mechanism signal corresponding to said indication of the engine turn-off to said discharge level tester;

(iv) a high discharge indicator operatively connected to said discharge level tester for receiving said delayed discharge level tester signal corresponding to the battery abnormal discharging, and providing an indication of the battery abnormal discharging to an engine operator following the engine turn-off; and (v) a second circuit voltage level tester operatively connected to the engine battery for measuring said battery voltage, comparing said battery voltage to a pre-determined battery voltage level corresponding to the engine turn-off, and sending a second circuit voltage level tester signal to said delay mechanism when said battery voltage is less than said pre-determined battery voltage level corresponding to the engine turn-off.

2. The device of claim 1, wherein said first circuit current sensor features a current sensor mechanism selected from the group consisting of a Hall Effect current sensor mechanism configured externally and immediately parallel to a wire electrically connecting a battery lead to a load of the engine, and a current sensor mechanism electrically connected in series of a wire electrically connecting a battery lead to said load of the engine.

3. The device of claim 1, wherein said first circuit said in-use battery charging current sensed by said first circuit current sensor corresponds to said battery charging current selected from the group consisting of normal battery charging current and abnormal battery charging current.

4. The device of claim 1, wherein said first circuit said pre-determined battery charging level includes a charging level greater than initial battery charging effected by a charging mechanism, said charging mechanism is selected from the group consisting of an alternator and a generator.

5. The device of claim 1, wherein said first circuit said indication of the in-use battery charging provided by said charge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal is selected from the group consisting of an audio signal, a visual signal, and an electromagnetic signal, said non-warning signal includes a digital readout.

6. The device of claim 1, wherein said first circuit said first circuit voltage level tester is connected to the engine battery by a connection selected from the group consisting of a direct electromechanical connection to leads of the battery and an indirect electrical connection to the engine battery, said indirect electrical connection features said first circuit voltage level tester connected in an electrical circuit of the engine selected from the group consisting of internal to a part of the engine and external to the engine.

7. The device of claim 1, wherein said second circuit said at least one pre-determined battery discharging level corresponding to the battery abnormal discharging is selected from the group consisting of a battery discharging level corresponding to vehicle headlights in an operative mode, a battery discharging level corresponding to vehicle hazard lights in an operative mode, a battery discharging level corresponding to a vehicle anti-theft alarm device in an abnormal operative mode, and a battery discharging level corresponding to at least one vehicle accessory in an abnormal operative mode.

8. The device of claim 1, wherein said second circuit said indication of the battery abnormal discharging provided by said high discharge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal selected from the group consisting of an audio signal, a visual signal, and an electromagnetic signal.

9. The device of claim 1, wherein said second circuit said second circuit voltage level tester is connected to the engine battery by a connection selected from the group consisting of a direct electromechanical connection to leads of the battery and an indirect electrical connection to the engine battery, said indirect electrical connection features said second circuit voltage level tester connected in an electrical circuit of the engine selected from the group consisting of internal to a part of the engine and external to the engine.

10. The device of claim 1, further comprising at least one temperature sensor associated with corresponding at least one component of the device selected from the group consisting of said charge level tester, said discharge level tester, said first circuit voltage level tester, and said second circuit voltage level tester, for measuring ambient temperature in a vicinity of the engine, and wherein said at least one component varies and is adjustable in relation to said ambient temperature.

11. The device of claim 1, wherein said first circuit current sensor and said second circuit current sensor are configured, operatively connected, and function as a single current sensor for sensing battery current selected from the group consisting of said in-use battery charging current and said battery discharging current, converting said sensed battery current into a voltage proportional to said sensed battery current, and generating a current sensor signal selected from the group consisting of said in-use battery charging signal and said battery discharging signal, corresponding to said voltage.

12. The device of claim 1, wherein said first circuit voltage level tester and said second circuit voltage level tester are configured, operatively connected to the engine battery, and function as a single voltage level tester for measuring said battery voltage, comparing said battery voltage to said pre-determined battery voltage levels, sending a said corresponding voltage level tester signal to said latch circuit for resetting said latch circuit when said battery voltage is less than said pre-determined battery voltage level corresponding to engine starting, and sending a said corresponding voltage level tester signal to said delay mechanism when said battery voltage is less than said pre-determined battery voltage level corresponding to the engine turn-off.

13. The device of claim 1, further comprising:
(c) a third circuit operatively connected to said voltage level tester selected from the group consisting of said first circuit voltage level tester and said second circuit voltage level tester, for detecting and warning of a problem with a starter mechanism of the combustion engine.

14. The device of claim 13, wherein said third circuit comprises:
(i) said voltage level tester for continuously measuring said battery voltage at the end of a given engine starting time interval;
(ii) a timer responsive to activation of said starter mechanism to time said given engine starting time interval;
(iii) a counter for maintaining a cumulative count of occasions on which said battery voltage is below a given level; and
(iv) an alarm unit for providing a warning signal, said warning signal actuated in at least one form selected from the group consisting of an audible signal, a visual signal, and an electromagnetic signal, when said cumulative count exceeds a pre-determined number of counts, following activation of said starter mechanism, said warning signal temporally actuated selected from the group consisting of during activation of said starter mechanism, following engine turn-off, and, during activation of said starter mechanism and following engine turn-off.

15. A device for indicating in-use charging and abnormal discharging of a combustion engine battery following engine turn-off, comprising:
(a) a first circuit for the indicating in-use battery charging during engine operation, through and following engine turn-off, said first circuit comprising:
(i) a first circuit current sensor operatively connected for sensing in-use battery charging current, converting said sensed in-use battery charging current into a voltage proportional to said sensed in-use battery charging current, and generating an in-use battery charging signal corresponding to said voltage;
(ii) a charge level tester operatively connected to said first circuit current sensor for measuring a magnitude of said in-use battery charging signal sent by said first circuit current sensor, comparing said in-use battery charging signal magnitude to a pre-determined in-use battery charging level, and generating a charge level tester signal proportional to said in-use battery charging signal magnitude when said in-use battery charging signal magnitude is greater than said pre-determined in-use battery charging level;
(iii) a latch circuit operatively connected to said charge level tester for receiving and registering said charge level tester signal sent by said charge level tester as an indication of the in-use battery charging, storing said indication of the in-use battery charging, and generating a latch circuit signal corresponding to said stored indication of the in-use battery charging;
(iv) a charge indicator operatively connected to said latch circuit for receiving said latch circuit signal corresponding to said stored indication of the in-use battery charging, and providing an indication of the in-use battery charging to an engine operator during the engine operation, through and following the engine turn-off; and (v) a voltage level tester operatively connected to the engine battery for measuring voltage of the engine battery, comparing said battery voltage to a pre-determined battery voltage level corresponding to engine starting, and sending a voltage level tester signal to said latch circuit for resetting said latch circuit when said battery voltage is less than said pre-determined battery voltage level corresponding to engine starting; and (b) a second circuit for the indicating abnormal battery discharging following engine turn-off, said second circuit comprising:

(i) a second circuit current sensor operatively connected for sensing battery discharging current, converting said sensed battery discharging current into a voltage proportional to said sensed battery discharging current, and generating a battery discharging signal corresponding to said voltage;

(ii) a discharge level tester operatively connected to said second circuit current sensor for measuring a magnitude of said battery discharging signal sent by said second circuit current sensor, comparing said battery discharging signal magnitude to at least one pre-determined battery discharging level corresponding to the battery abnormal discharging, and generating a discharge level tester signal proportional to said battery discharging signal magnitude when said battery discharging signal magnitude is greater than said at least one pre-determined battery discharging level;

(iii) a delay mechanism for delaying sending of said discharge level tester signal by said discharge level tester until said delay mechanism receives an indication of the engine turnoff and sends a delay mechanism signal corresponding to said indication of engine turn-off to said discharge level tester;

(iv) a high discharge indicator operatively connected to said discharge level tester for receiving said delayed discharge level tester signal corresponding to the battery abnormal discharging, and providing an indication of the battery abnormal discharging to an engine operator;

(v) at least one engine characteristic sensor selected from the group consisting of engine noise sensors and engine vibration sensors operatively connected for sensing at least one engine characteristic selected from the group consisting of engine noise and engine vibration, and generating at least one engine characteristic sensor signal corresponding to said at least one engine characteristic; and (vi) at least one engine characteristic level tester selected from the group consisting of engine noise level testers and engine vibration level testers operatively connected to said at least one engine characteristic sensor for measuring said at least to one engine characteristic sensor signal generated and sent by said at least one engine characteristic sensor, comparing said measurement to at least one corresponding pre-determined threshold level of said at least one engine characteristic for distinguishing between engine operation and engine non-operation, said engine non-operation including the engine turn-off, and sending at least one engine characteristic level tester signal to said delay mechanism when said measurement is less than said at least one corresponding pre-determined threshold level of said at least one engine characteristic corresponding to the engine turn-off.

16. The device of claim 15, wherein said first circuit current sensor features a current sensor mechanism selected from the group consisting of a Hall Effect current sensor mechanism configured externally and immediately parallel to a wire electrically connecting a battery lead to a load of the engine, and a current sensor mechanism electrically connected in series of a wire electrically connecting a battery lead to said load of the engine.

17. The device of claim 15, wherein said first circuit said in-use battery charging current sensed by said first circuit current sensor corresponds to said battery charging current selected from the group consisting of normal battery charging current and abnormal battery charging current.

18. The device of claim 15, wherein said first circuit pre-determined battery charging level includes a charging level greater than initial battery charging effected by a charging mechanism, said charging mechanism is selected from the group consisting of an alternator and a generator.

19. The device of claim 15, wherein said first circuit said indication of the in-use battery charging provided by said charge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal selected from the group consisting of audio signals, visual signals, and electromagnetic signals, said non-warning signal includes a digital readout.

20. The device of claim 15, wherein said first circuit said first circuit voltage level tester is connected to the engine battery by a connection selected from the group consisting of a direct electromechanical connection to leads of the battery and an indirect electrical connection to the engine battery, said indirect electrical connection features said first circuit.voltage level tester connected in an electrical circuit of the engine selected from the group consisting of internal to a part of the engine and external to the engine.

21. The device of claim 15, wherein said second circuit said at least one pre-determined battery discharging level corresponding to the battery abnormal discharging is selected from the group consisting of a battery discharging level corresponding to vehicle headlights in an operative mode, a battery discharging level corresponding to vehicle hazard lights in an operative mode, a battery discharging level corresponding to a vehicle anti-theft alarm device in an abnormal operative mode, and a battery discharging level corresponding to at least one vehicle accessory in an abnormal operative mode.

22. The device of claim 15, wherein said second circuit said indication of the battery abnormal discharging provided by said high discharge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal selected from the group consisting of an audio signal, a visual signal, and an electromagnetic signal.

23. The device of claim 15, wherein said second circuit said second circuit voltage level tester is connected to the engine battery by a connection selected from the group consisting of a direct electromechanical connection to leads of the battery and an indirect electrical connection to the engine battery, said indirect electrical connection features said second circuit voltage level tester connected in an electrical circuit of the engine selected from the group consisting of internal to a part of the engine and external to the engine.

24. The device of claim 15, wherein said second circuit said at least one engine characteristic level tester measures said at least one engine characteristic sensor signal as a function of time selected from the group consisting of a continuous function of time and a discontinuous function of time.

25. The device of claim 15, wherein said first circuit current sensor and said second circuit current sensor are configured, operatively connected, and function as a single current sensor for sensing battery current selected from the group consisting of said in-use battery charging current and said battery discharging current, converting said sensed battery current into a voltage proportional to said sensed battery current, and generating a current sensor signal selected from the group consisting of said in-use battery charging signal and said battery discharging signal, corresponding to said voltage.

26. The device of claim 15, further comprising at least one temperature sensor associated with corresponding at least one component of the device selected from the group consisting of said charge level tester, said discharge level tester, said first circuit voltage level tester, said second circuit voltage level tester, and said at least one engine characteristic level tester, for measuring ambient temperature in a vicinity of the engine, and wherein said at least one component varies and is adjustable in relation to said ambient temperature.

27. The device of claim 15, further comprising:
  (c) a third circuit operatively connected to said voltage level tester for detecting and warning of a problem with a starter mechanism of the combustion engine.

28. The device of claim 27, wherein said third circuit comprises:
  (i) said voltage level tester for continuously measuring said battery voltage at the end of a given engine starting time interval;
  (ii) a timer responsive to activation of said starter mechanism to time said given engine starting time interval;
  (iii) a counter for maintaining a cumulative count of occasions on which said battery voltage is below a given level; and
  (iv) an alarm unit for providing a warning signal, said warning signal actuated in at least one form selected from the group consisting of an audible signal, a visual signal, and an electromagnetic signal, when said cumulative count exceeds a pre-determined number of counts, following activation of said starter mechanism, said warning signal -temporally actuated selected from the group consisting of during activation of said starter mechanism, following engine turn-off, and, during activation of said starter mechanism and following engine turn-off.

29. A device for indicating abnormal discharging of a combustion engine battery following engine turn-off, comprising:
  (a) a current sensor operatively connected for sensing battery discharging current, converting said sensed battery discharging current into a voltage proportional to said sensed battery discharging current, and generating a battery discharging signal corresponding to said voltage;
  (b) a discharge level tester operatively connected to said current sensor for measuring a magnitude of said battery discharging signal sent by said current sensor, comparing said battery discharging signal magnitude to at least one pre-determined battery discharging level corresponding to the battery abnormal discharging, and generating a discharge level tester signal proportional to said battery discharging signal magnitude when said battery discharging signal magnitude is greater than said at least one pre-determined battery discharging level;
  (c) a delay mechanism for delaying sending of said discharge level tester signal by said discharge level tester until said delay mechanism receives an indication of the engine turn-off and sends a delay mechanism signal corresponding to said indication of the engine turn-off to said discharge level tester;
  (d) a high discharge indicator operatively connected to said discharge level tester for receiving said delayed discharge level tester signal corresponding to the battery abnormal discharging, and providing an indication of the battery abnormal discharging to an engine operator following the engine turn-off; and
  (e) a voltage level tester operatively connected to the engine battery for measuring said battery voltage, comparing said battery voltage to a pre-determined battery voltage level corresponding to the engine turn-off, and sending a voltage level tester signal to said delay mechanism when said battery voltage is less than said pre-determined battery voltage level corresponding to the engine turn-off.

30. The device of claim 29, wherein said current sensor features a current sensor mechanism selected from the group consisting of a Hall Effect current sensor mechanism configured externally and immediately parallel to a wire electrically connecting a battery lead to a load of the engine, and a current sensor mechanism electrically connected in series of a wire electrically connecting a battery lead to said load of the engine.

31. The device of claim 29, wherein said at least one pre-determined battery discharging level corresponding to the battery abnormal discharging is selected from the group consisting of a battery discharging level corresponding to vehicle headlights in an operative mode, a battery discharging level corresponding to vehicle hazard lights in an operative mode, a battery discharging level corresponding to a vehicle anti-theft alarm device in an abnormal operative mode, and a battery discharging level corresponding to at least one vehicle accessory in an abnormal operative mode.

32. The device of claim 29, wherein said indication of the battery abnormal discharging provided by said high discharge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal selected from the group consisting of an audio signal, a visual signal, and an electromagnetic signal.

33. The device of claim 29, wherein said voltage level tester is connected to the engine battery by a connection selected from the group consisting of a direct electromechanical connection to leads of the battery and an indirect electrical connection to the engine battery, said indirect electrical connection features said voltage level tester connected in an electrical circuit of the engine selected from the group consisting of internal to a part of the engine and external to the engine.

34. The device of claim 29, further comprising at least one temperature sensor associated with corresponding at least one component of the device selected from the group consisting of said discharge level tester, and said voltage level tester, for measuring ambient temperature in a vicinity of the engine, and wherein said at least one component varies and is adjustable in relation to said ambient temperature.

35. The device of claim 29, further comprising:
(f) a second circuit operatively connected to said voltage level tester for detecting and warning of a problem with a starter mechanism of the combustion engine.

36. The device of claim 35, wherein said second circuit comprises:
(i) said voltage level tester for continuously measuring said battery voltage at the end of a given engine starting time interval;
(ii) a timer responsive to activation of said starter mechanism to time said given engine starting time interval;
(iii) a counter for maintaining a cumulative count of occasions on which said battery voltage is below a given level; and
(iv) an alarm unit for providing a warning signal, said warning signal actuated in at least one form selected from the group consisting of an audible signal, a visual signal, and an electromagnetic signal, when said cumulative count exceeds a pre-determined number of counts, following activation of said starter mechanism, said warning signal temporally actuated selected from the group consisting of during activation of said starter mechanism, following engine turn-off, and, during activation of said starter mechanism and following engine turn-off.

37. A device for indicating abnormal discharging of a combustion engine battery following engine turn-off, comprising:
(a) a current sensor operatively connected for sensing battery discharging current, converting said sensed battery discharging current into a voltage proportional to said sensed battery discharging current, and generating a battery discharging signal corresponding to said voltage;
(b) a discharge level tester operatively connected to said current sensor for measuring a magnitude of said battery discharging signal sent by said current sensor, comparing said battery discharging signal magnitude to at least one pre-determined battery discharging level corresponding to the battery abnormal discharging, and generating a discharge level tester signal proportional to said battery discharging signal magnitude when said battery discharging signal magnitude is greater than said at least one pre-determined battery discharging level;
(c) a delay mechanism for delaying sending of said discharge level tester signal by said discharge level tester until said delay mechanism receives an indication of the engine turn-off and sends a delay mechanism signal corresponding to said indication of the engine turn-off to said discharge level tester;
(d) a high discharge indicator operatively connected to said discharge level tester for receiving said delayed discharge level tester signal corresponding to the battery abnormal discharging, and providing an indication of the battery abnormal discharging to an engine operator following the engine turn-off;
(e) at least one engine characteristic sensor selected from the group consisting of engine noise sensors and engine vibration sensors operatively connected for sensing at least one engine characteristic selected from the group consisting of engine noise and engine vibration, and generating at least one engine characteristic sensor signal corresponding to said at least one engine characteristic; and
(f) at least one engine characteristic level tester selected from the group consisting of engine noise level testers and engine vibration level testers operatively connected to said at least one engine characteristic sensor for measuring said at least one engine characteristic sensor signal generated and sent by said at least one engine characteristic sensor, comparing said measurement to at least one corresponding predetermined threshold level of said at least one engine characteristic for distinguishing between engine operation and engine non-operation, said engine non-operation including the engine turn-off, and sending at least one engine characteristic level tester signal to said delay mechanism when said measurement is less than said at least one corresponding pre-determined threshold level of said at least one engine characteristic corresponding to the engine turn-off.

38. The device of claim 37, wherein said current sensor features a current sensor mechanism selected from the group consisting of a Hall Effect current sensor mechanism configured externally and immediately parallel to a wire electrically connecting a battery lead to a load of the engine, and a current sensor mechanism electrically connected in series of a wire electrically connecting a battery lead to said load of the engine.

39. The device of claim 37, wherein said at least one pre-determined battery discharging level corresponding to the battery abnormal discharging is selected from the group consisting of a battery discharging level corresponding to vehicle headlights in an operative mode, a battery discharging level corresponding to vehicle hazard lights in an operative mode, a battery discharging level corresponding to a vehicle anti-theft alarm device in an abnormal operative mode, and a battery discharging level corresponding to at least one vehicle accessory in an abnormal operative mode.

40. The device of claim 37, wherein said indication of the battery abnormal discharging provided by said high discharge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal selected from the group consisting of an audio signal, a visual signal, and an electromagnetic signal.

41. The device of claim 37, wherein said voltage level tester is connected to the engine battery by a connection selected from the group consisting of a direct electromechanical connection to leads of the battery and an indirect electrical connection to the engine battery, said indirect electrical connection features said voltage level tester connected in an electrical circuit of the engine selected from the group consisting of internal to a part of the engine and external to the engine.

42. The device of claim 37, wherein said at least one engine characteristic level tester measures said at least one engine characteristic sensor signal as a function of time selected from the group consisting of a continuous function of time and a discontinuous function of time.

43. The device of claim 37, further comprising at least one temperature sensor associated with corresponding at least one component of the device selected from the group consisting of said discharge level tester, said voltage level tester, and said at least one engine characteristic level tester, for measuring ambient temperature in a vicinity of the engine, and wherein said at least one component varies and is adjustable in relation to said ambient temperature.

44. The device of claim 37, further comprising:
(g) a second circuit operatively connected to said voltage level tester for detecting and warning of a problem with a starter mechanism of the combustion engine.

45. The device of claim 44, wherein said second circuit comprises:
(i) said voltage level tester for continuously measuring said battery voltage at the end of a given engine starting time interval;
(ii) a timer responsive to activation of said starter mechanism to time said given engine starting time interval;
(iii) a counter for maintaining a cumulative count of occasions on which said battery voltage is below a given level; and
(iv) an alarm unit for providing a warning signal, said warning signal actuated in at least one form selected from the group consisting of an audible signal, a visual signal, and an electromagnetic signal, when said cumulative count exceeds a pre-determined number of counts, following activation of said starter mechanism, said warning signal temporally actuated selected from the group consisting of during activation of said starter mechanism, following engine turn-off, and, during activation of said starter mechanism and following engine turn-off.

46. A method for indicating in-use charging and abnormal discharging of a combustion engine battery following engine turn-off, comprising:
a) indicating in-use battery charging during engine operation, through and following engine turn-off, by operation of a first circuit, said operation of said first circuit comprising:
(i) sensing in-use battery charging current, converting said sensed in-use battery charging current into a voltage proportional to said sensed in-use battery charging current, and generating an in-use battery charging signal corresponding to said voltage, by an operatively connected first circuit current sensor;
(ii) measuring a magnitude of said in-use battery charging signal sent by said first circuit current sensor, comparing said first in-use battery charging signal magnitude to a pre-determined in-use battery charging level, and generating a charge level tester signal proportional to said in-use battery charging signal magnitude when said in-use battery charging signal magnitude is greater than said pre-determined in-use battery charging level, by a charge level tester operatively connected to said first circuit current sensor;
(iii) receiving and registering said charge level tester signal sent by said charge level tester as an indication of the in-use battery charging, storing said indication of the in-use battery charging, and generating a latch circuit signal corresponding to said stored indication of the in-use battery charging, by a latch circuit operatively connected to said charge level tester;
(iv) receiving said latch circuit signal corresponding to said stored indication of the in-use battery charging, and providing an indication of said in-use battery charging to an engine operator during the in-use engine operation, through and following the engine turn-off, by a charge indicator operatively connected to said latch circuit; and
(v) measuring voltage of the engine battery, comparing said battery voltage to a pre-determined battery voltage level corresponding to engine starting, and sending a first circuit voltage level tester signal to said latch circuit for resetting said latch circuit when said battery voltage is less than said pre-determined battery voltage level corresponding to engine starting, by a first circuit voltage level tester operatively connected to the engine battery; and
(b) indicating abnormal battery discharging following engine turn-off, by operation of a second circuit, said operation of said second circuit comprising:
(i) sensing battery discharging current, converting said sensed battery discharging current into a voltage proportional to said sensed battery discharging current, and generating a battery discharging signal corresponding to said voltage, by an operatively connected second circuit current sensor;
(ii) measuring a magnitude of said battery discharging signal sent by said second circuit current sensor, comparing said battery discharging signal magnitude to at least one pre-determined battery discharging level corresponding to the battery abnormal discharging, and generating a discharge level tester signal proportional to said battery discharging signal magnitude when said battery discharging signal magnitude is greater than said at least one pre-determined battery discharging level, by a discharge level tester operatively connected to said second circuit current sensor;
(iii) delaying sending of said discharge level tester signal by said discharge level tester until a delay mechanism receives an indication of the engine turn-off and sends a delay mechanism signal corresponding to said indication of the engine turn-off to said discharge level tester, by said delay mechanism operatively connected to said discharge level tester;
(iv) receiving said delayed discharge level tester signal corresponding to the battery abnormal discharging, and providing an indication of the battery abnormal discharging to an engine operator following the engine turn-off, by a high discharge indicator operatively connected to said discharge level tester; and
(v) measuring said battery voltage, comparing said battery voltage to a pre-determined battery voltage level corresponding to the engine turn-off, and sending a second circuit voltage level tester signal to said delay mechanism when said battery voltage is less than said pre-determined battery voltage level corresponding to the engine turn-off, by a second circuit voltage level tester operatively connected to the engine battery.

47. The method of claim 46, wherein said first circuit current sensor operates according to a current sensor mechanism selected from the group consisting of a Hall Effect current sensor mechanism configured externally and immediately parallel to a wire electrically connecting a battery lead to a load of the engine, and a current sensor mechanism electrically connected in series of a wire electrically connecting a battery lead to said load of the engine.

48. The method of claim 46, wherein said first circuit said in-use battery charging current sensed by said first circuit current sensor corresponds to said battery charging current selected from the group consisting of normal battery charging current and abnormal battery charging current.

49. The method of claim 46, wherein said first circuit said pre-determined battery charging level includes a charging level greater than initial battery charging effected by a charging mechanism, said charging mechanism is selected from the group consisting of an alternator and a generator.

50. The method of claim 46, wherein said first circuit said indication of the in-use battery charging provided by said charge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal is selected from the group consisting of an audio signal, a visual signal, and an electromagnetic signal, said non-warning signal includes a digital readout.

51. The method of claim 46, wherein said first circuit said first circuit voltage level tester is connected to the engine battery by a connection selected from the group consisting of a direct electromechanical connection to leads of the battery and an indirect electrical connection to the engine battery, said indirect electrical connection features said first circuit voltage level tester connected in an electrical circuit of the engine selected from the group consisting of internal to a part of the engine and external to the engine.

52. The method of claim 46, wherein said second circuit said at least one pre-determined battery discharging level corresponding to the battery abnormal discharging is selected from the group consisting of a battery discharging level corresponding to vehicle headlights in an operative mode, a battery discharging level corresponding to vehicle hazard lights in an operative mode, a battery discharging level corresponding to a vehicle anti-theft alarm device in an abnormal operative mode, and a battery discharging level corresponding to at least one vehicle accessory in an abnormal operative mode.

53. The method of claim 46, wherein said second circuit said indication of the battery abnormal discharging provided by said high discharge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal selected from the group consisting of an audio signal, a visual signal, and an electromagnetic signal.

54. The method of claim 46, wherein said second circuit said second circuit voltage level tester is connected to the engine battery by a connection selected from the group consisting of a direct electromechanical connection to leads of the battery and an indirect electrical connection to the engine battery, said indirect electrical connection features said second circuit voltage level tester connected in an electrical circuit of the engine selected from the group consisting of internal to a part of the engine and external to the engine.

55. The method of claim 46, further comprising the step of associating at least one temperature sensor with corresponding at least one component of said first circuit and said second circuit selected from the group consisting of said charge level tester, said discharge level tester, said first circuit voltage level tester, and said second circuit voltage level tester, for measuring ambient temperature in a vicinity of the engine, and wherein said corresponding at least one component varies and is adjustable in relation to said ambient temperature.

56. The method of claim 46, wherein said first circuit current sensor and said second circuit current sensor are configured, operatively connected, and function as a single current sensor for sensing battery current selected from the group consisting of said in-use battery charging current and said battery discharging current, converting said sensed battery current into a voltage proportional to said sensed battery current, and generating a current sensor signal selected from the group consisting of said in-use battery charging signal and said battery discharging signal, corresponding to said voltage.

57. The method of claim 46, wherein said first circuit voltage level tester and said second circuit voltage level tester are configured, operatively connected to the engine battery, and function as a single voltage level tester for measuring said battery voltage, comparing said battery voltage to said pre-determined battery voltage levels, sending a said corresponding voltage level tester signal to said latch circuit for resetting said latch circuit when said battery voltage is less than said pre-determined battery voltage level corresponding to engine starting, and sending a said corresponding voltage level tester signal to said delay mechanism when said battery voltage is less than said pre-determined battery voltage level corresponding to the engine turn-off.

58. A method for indicating in-use charging and abnormal discharging of a combustion engine battery following engine turn-off, comprising:
   a) indicating in-use battery charging during engine operation, through and following engine turn-off, by operation of a first circuit, said operation of said first circuit comprising:
      (i) sensing in-use battery charging current, converting said sensed in-use battery charging current into a voltage proportional to said sensed in-use battery charging current, and generating an in-use battery charging signal corresponding to said voltage, by an operatively connected first circuit current sensor;
      (ii) measuring a magnitude of said in-use battery charging signal sent by said first circuit current sensor, comparing said in-use battery charging signal magnitude to a pre-determined in-use battery charging level, and generating a charge level tester signal proportional to said in-use battery charging signal magnitude when said in-use battery charging signal magnitude is greater than said pre-determined in-use battery charging level, by a charge level tester operatively connected to said first circuit current sensor;
      (iii) receiving and registering said charge level tester signal sent by said charge level tester as an indication of the in-use battery charging, storing said indication of the in-use battery charging, and generating a latch circuit signal corresponding to said stored indication of the in-use battery charging, by a latch circuit operatively connected to said charge level tester;
      (iv) receiving said latch circuit signal corresponding to said stored indication of the in-use battery charging, and providing an indication of said in-use battery charging to an engine operator during the in-use engine operation, through and following the engine turn-off, by a charge indicator operatively connected to said latch circuit; and (v) measuring voltage of the engine battery, comparing said battery voltage to a pre-determined battery voltage level corresponding to engine starting, and sending a first circuit voltage level tester signal to said latch circuit for resetting said latch circuit when said battery voltage is less than said pre-determined battery voltage level corresponding to engine starting, by a first circuit voltage level tester operatively connected to the engine battery; and (b) indicating abnormal battery discharging following engine turn-off, by operation of a second circuit, said operation of said second circuit comprising:

(i) sensing battery discharging current, converting said sensed battery discharging current into a voltage proportional to said sensed battery discharging current, and generating a battery discharging signal corresponding to said voltage, by an operatively connected second circuit current sensor;

(ii) measuring a magnitude of said battery discharging signal sent by said second circuit current sensor, comparing said battery discharging signal magnitude to at least one predetermined battery discharging level corresponding to the battery abnormal discharging, and generating a discharge level tester signal proportional to said battery discharging signal magnitude when said battery discharging signal magnitude is greater than said at least one pre-determined battery discharging level, by a discharge level tester operatively connected to said second circuit current sensor;

(iii) delaying sending of said discharge level tester signal by said discharge level tester until a delay mechanism receives an indication of the engine turn-off and sends a delay mechanism signal corresponding to said indication of the engine turn-off to said discharge level tester, by said delay mechanism operatively connected to said discharge level tester;

(iv) receiving said delayed discharge level tester signal corresponding to the battery abnormal discharging, and providing an indication of the battery abnormal discharging to an engine operator following the engine turn-off, by a high discharge indicator operatively connected to said discharge level tester;

(v) sensing at least one engine characteristic selected from the group consisting of engine noise and engine vibration, and generating at least one engine characteristic sensor signal corresponding to said at least one engine characteristic, by at least one operatively connected engine characteristic sensor selected from the group consisting of engine noise sensors and engine vibration sensors; and (vi) measuring said at least one engine characteristic sensor signal generated and sent by said at least one engine characteristic sensor, comparing said measurement to at least one corresponding pre-determined threshold level of said at least one engine characteristic for distinguishing between engine operation and engine non-operation, said engine non-operation including the engine turn-off, and sending at least one engine characteristic level tester signal to said delay mechanism when said measurement is less than said at least one corresponding pre-determined threshold level of said at least one engine characteristic corresponding to the engine turn-off, by at least one engine characteristic level tester selected from the group consisting of engine noise level testers and engine vibration level testers operatively connected to said at least one engine characteristic sensor.

59. The method of claim 58, wherein said first circuit current sensor operates according to a current sensor mechanism selected from the group consisting of a Hall Effect current sensor mechanism configured externally and immediately parallel to a wire electrically connecting a battery lead to a load of the engine, and a current sensor mechanism electrically connected in series of a wire electrically connecting a battery lead to said load of the engine.

60. The method of claim 58, wherein said first circuit said in-use battery charging current sensed by said first circuit current sensor corresponds to said battery charging current selected from the group consisting of normal battery charging current and abnormal battery charging current.

61. The method of claim 58, wherein said first circuit pre-determined battery charging level includes a charging level greater than initial battery charging effected by a charging mechanism, said charging mechanism is selected from the group consisting of an alternator and a generator.

62. The method of claim 58, wherein said first circuit said indication of the in-use battery charging provided by said charge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal selected from the group consisting of audio signals, visual signals, and electromagnetic signals, said non-warning signal includes a digital readout.

63. The method of claim 58, wherein said first circuit said first circuit voltage level tester is connected to the engine battery by a connection selected from the group consisting of a direct electromechanical connection to leads of the battery and an indirect electrical connection to the engine battery, said indirect electrical connection features said first circuit voltage level tester connected in an electrical circuit of the engine selected from the group consisting of internal to a part of the engine and external to the engine.

64. The method of claim 58, wherein said second circuit said at least one pre-determined battery discharging level corresponding to the battery abnormal discharging is selected from the group consisting of a battery discharging level corresponding to vehicle headlights in an operative mode, a battery discharging level corresponding to vehicle hazard lights in an operative mode, a battery discharging level corresponding to a vehicle anti-theft alarm device in an abnormal operative mode, and a battery discharging level corresponding to at least one vehicle accessory in an abnormal operative mode.

65. The method of claim 58, wherein said second circuit said indication of the battery abnormal discharging provided by said high discharge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal selected from the group consisting of an audio signal, a visual signal, and an electromagnetic signal.

66. The method of claim 58, wherein said second circuit said second circuit voltage level tester is connected to the engine battery by a connection selected from the group consisting of a direct electromechanical connection to leads of the battery and an indirect electrical connection to the engine battery, said indirect electrical connection features said second circuit voltage level tester connected in an electrical circuit of the engine selected from the group consisting of internal to a part of the engine and external to the engine.

67. The method of claim 58, wherein said second circuit said at least one engine characteristic level tester measures said at least one engine characteristic sensor signal as a function of time selected from the group consisting of a continuous function of time and a discontinuous function of time.

68. The method of claim 58, wherein said first circuit current sensor and said second circuit current sensor are configured, operatively connected, and function as a single current sensor for sensing battery current selected from the group consisting of said in-use battery charging current and said battery discharging current, converting said sensed battery current into a voltage proportional to said sensed battery current, and generating a current sensor signal selected from the group consisting of said in-use battery charging signal and said battery discharging signal, corresponding to said voltage.

69. The method of claim 58, further comprising the step of associating at least one temperature sensor with corresponding at least one component of said first circuit and said second circuit selected from the group consisting of said charge level tester, said discharge level tester, said first circuit voltage level tester, said second circuit voltage level tester, and said at least one engine characteristic level tester, for measuring ambient temperature in a vicinity of the engine, and wherein said at least one component varies and is adjustable in relation to said ambient temperature.

70. A method for indicating abnormal discharging of a combustion engine battery following engine turn-off, comprising:

(a) sensing battery discharging current, converting said sensed battery discharging current into a voltage proportional to said sensed battery discharging current, and generating a battery discharging signal corresponding to said voltage, by an operatively connected current sensor;

(b) measuring a magnitude of said battery discharging signal sent by said current sensor, comparing said battery discharging signal magnitude to at least one pre-determined battery discharging level corresponding to the battery abnormal discharging, and generating a discharge level tester signal proportional to said battery discharging signal magnitude when said battery discharging signal magnitude is greater than said at least one pre-determined battery discharging level, by a discharge level tester operatively connected to said current sensor;

(c) delaying sending of said discharge level tester signal by said discharge level tester until a delay mechanism receives an indication of the engine turn-off and sends a delay mechanism signal corresponding to said indication of the engine turn-off to said discharge level tester, by said delay mechanism operatively connected to said discharge level tester;

(d) receiving said delayed discharge level tester signal corresponding to the battery abnormal discharging, and providing an indication of the battery abnormal discharging to an engine operator following the engine turn-off, by a high discharge indicator operatively connected to said discharge level tester; and (e) measuring said battery voltage, comparing said battery voltage to a pre-determined battery voltage level corresponding to the engine turn-off, and sending a voltage level tester signal to said delay mechanism when said battery voltage is less than said pre-determined battery voltage level corresponding to the engine turn-off, by a voltage level tester operatively connected to the engine battery.

71. The method of claim 70, wherein said current sensor operates according to a current sensor mechanism selected from the group consisting of a Hall Effect current sensor mechanism configured externally and immediately parallel to a wire electrically connecting a battery lead to a load of the engine, and a current sensor mechanism electrically connected in series of a wire electrically connecting a battery lead to said load of the engine.

72. The method of claim 70, wherein said at least one pre-determined battery discharging level corresponding to the battery abnormal discharging is selected from the group consisting of a battery discharging level corresponding to vehicle headlights in an operative mode, a battery discharging level corresponding to vehicle hazard lights in an operative mode, a battery discharging level corresponding to a vehicle anti-theft alarm device in an abnormal operative mode, and a battery discharging level corresponding to at least one vehicle accessory in an abnormal operative mode.

73. The method of claim 70, wherein said indication of the battery abnormal discharging provided by said high discharge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal selected from the group consisting of an audio signal, a visual signal, and an electromagnetic signal.

74. The method of claim 70, wherein said voltage level tester is connected to the engine battery by a connection selected from the group consisting of a direct electromechanical connection to leads of the battery and an indirect electrical connection to the engine battery, said indirect electrical connection features said voltage level tester connected in an electrical circuit of the engine selected from the group consisting of internal to a part of the engine and external to the engine.

75. The method of claim 70, further comprising the step of associating at least one temperature sensor with corresponding at least one component selected from the group consisting of said discharge level tester, and said voltage level tester, for measuring ambient temperature in a vicinity of the engine, and wherein said corresponding at least one component varies and is adjustable in relation to said ambient temperature.

76. A method for indicating abnormal discharging of a combustion engine battery following engine turn-off, comprising:

(a) sensing battery discharging current, converting said sensed battery discharging current into a voltage proportional to said sensed battery discharging current, and generating a battery discharging signal corresponding to said voltage, by an operatively connected current sensor;

(b) measuring a magnitude of said battery discharging signal sent by said current sensor, comparing said battery discharging signal magnitude to at least one pre-determined battery discharging level corresponding to the battery abnormal discharging, and generating a discharge level tester signal proportional to said battery discharging signal magnitude when said battery discharging signal magnitude is greater than said at least one pre-determined battery discharging level, by a discharge level tester operatively connected to said current sensor;

(c) delaying sending of said discharge level tester signal by said discharge level tester until a delay mechanism receives an indication of the engine turn-off and sends a delay mechanism signal corresponding to said indication of the engine turn-off to said discharge level tester, by said delay mechanism operatively connected to said discharge level tester;

(d) receiving said delayed discharge level tester signal corresponding to the battery abnormal discharging, and providing an indication of the battery abnormal discharging to an engine operator following the engine turn-off, by a high discharge indicator operatively connected to said discharge level tester;

(e) sensing at least one engine characteristic selected from the group consisting of engine noise and engine vibration, and generating at least one engine characteristic sensor signal corresponding to said at least one engine characteristic, by at least one operatively connected engine characteristic sensor selected from the group consisting of engine noise sensors and engine vibration sensors; and (f) measuring said at least one engine characteristic sensor signal generated and sent by said at least one engine characteristic sensor, comparing said measurement to at least one corresponding pre-determined threshold level of said at least one engine characteristic for distinguishing between engine operation and engine non-operation, said engine non-operation including the engine turn-off, and sending at least one engine characteristic level tester signal to said delay mechanism when said measurement is less than said at least one corresponding pre-determined threshold level of said at least one engine characteristic corresponding to the engine turn-off, by at least one engine characteristic level tester selected from the group consisting of engine noise level testers and engine vibration level testers operatively connected to said at least one engine characteristic sensor.

77. The method of claim 76, wherein said current sensor operates according to a current sensor mechanism selected from the group consisting of a Hall Effect current sensor mechanism configured externally and immediately parallel to a wire electrically connecting a battery lead to a load of the engine, and a current sensor mechanism electrically connected in series of a wire electrically connecting a battery lead to said load of the engine.

78. The method of claim 76, wherein said at least one predetermined battery discharging level corresponding to the battery abnormal discharging is selected from the group consisting of a battery discharging level corresponding to vehicle headlights in an operative mode, a battery discharging level corresponding to vehicle hazard lights in an operative mode, a battery discharging level corresponding to a vehicle anti-theft alarm device in an abnormal operative mode, and a battery discharging level corresponding to at least one vehicle accessory in an abnormal operative mode.

79. The method of claim 76, wherein said indication of the battery abnormal discharging provided by said high discharge indicator appears at a location selected from the group consisting of internal to a part of the engine and external to a part of the engine, said external to a part of the engine includes internal to a vehicle cabin along a dashboard display, and whereby said indication is of a form selected from the group consisting of a warning signal and a non-warning signal, said warning signal selected from the group consisting of an audio signal, a visual signal, and an electromagnetic signal.

80. The method of claim 76, wherein said voltage level tester is connected to the engine battery by a connection selected from the group consisting of a direct electromechanical connection to leads of the battery and an indirect electrical connection to the engine battery, said indirect electrical connection features said voltage level tester connected in an electrical circuit of the engine selected from the group consisting of internal to a part of the engine and external to the engine.

81. The method of claim 76, wherein said at least one engine characteristic level tester measures said at least one engine characteristic sensor signal as a function of time selected from the group consisting of a continuous function of time and a discontinuous function of time.

82. The method of claim 76, further comprising the step of associating at least one temperature sensor with at least one component selected from the group consisting of said discharge level tester, said voltage level tester, and said at least one engine characteristic level tester, for measuring ambient temperature in a vicinity of the engine, and wherein said at least one component varies and is adjustable in relation to said ambient temperature.

* * * * *